US010024392B2

(12) United States Patent
Napau et al.

(10) Patent No.: US 10,024,392 B2
(45) Date of Patent: Jul. 17, 2018

(54) SINGLE-STAGE GEAR REDUCTION OUTPUT MECHANISM HAVING A LOCKING GEAR WITH PIN RECEIVING GUIDE HOLES AND ANTI-BACK DRIVE CAPABILITY FOR AUTOMOTIVE SEAT ADJUSTER DRIVES

(71) Applicant: FISHER & COMPANY, INCORPORATED, St. Clair Shores, MI (US)

(72) Inventors: Mircea Napau, Sterling Heights, MI (US); Doina Napau, Sterling Heights, MI (US); Ileana-Dacia Napau, Cugir (RO); Dean Lenane, Grosse Pointe Woods, MI (US); Matthew Essian, Clinton Township, MI (US); Ioan Napau, Rochester Hills, MI (US)

(73) Assignee: FISHER & COMPANY, INCORPORATED, St. Clair Shores, MI (US)

( * ) Notice: Subject to any disclaimer, the term of this patent is extended or adjusted under 35 U.S.C. 154(b) by 156 days.

(21) Appl. No.: 15/245,842

(22) Filed: Aug. 24, 2016

(65) Prior Publication Data
US 2017/0059001 A1    Mar. 2, 2017

Related U.S. Application Data

(60) Provisional application No. 62/209,602, filed on Aug. 25, 2015.

(51) Int. Cl.
*F16H 1/32* (2006.01)
*B60N 2/02* (2006.01)
(Continued)

(52) U.S. Cl.
CPC .......... *F16H 1/321* (2013.01); *B60N 2/0232* (2013.01); *B60N 2/181* (2013.01); *B60N 2/1835* (2013.01);
(Continued)

(58) Field of Classification Search
None
See application file for complete search history.

(56) References Cited

U.S. PATENT DOCUMENTS 546,249 A    9/1895  Regan
978,371 A   12/1910  Harrison
(Continued)

FOREIGN PATENT DOCUMENTS

DE    102009006815 A1    8/2009
EP        0450324 A2    10/1991
(Continued)

OTHER PUBLICATIONS

International Search Report and Written Opinion dated Nov. 28, 2016, regarding International Application No. PCT/US2016/048649.
(Continued)

*Primary Examiner* — Colby M Hansen
(74) *Attorney, Agent, or Firm* — Harness, Dickey & Pierce, P.L.C.

(57) ABSTRACT

A single-stage gear reduction output mechanism for an automotive seat assembly includes a gear housing bracket, gear housing, axle shaft, eccentric, and first and second gears. The axle shaft extends through the eccentric with a slip fit, the first gear rotates with the axle shaft, and the second gear is carried on a first bearing surface of the eccentric and meshingly engages the first gear in a planetary arrangement. The second gear includes an external flange with at least two guide holes. First and second support pins
(Continued)

that are rigidly fixed in place relative to the axle shaft extend through the two guide holes in the external flange of the second gear. Forces acting at the interfaces between the first and second support pins and the two guide holes and between the eccentric and the second gear prevent the first gear from back-driving rotation of the second gear.

20 Claims, 13 Drawing Sheets

(51) Int. Cl.
    *B60N 2/18* (2006.01)
    *B60N 2/225* (2006.01)
    *F16H 19/08* (2006.01)
    *F16H 57/021* (2012.01)
    *F16H 1/16* (2006.01)

(52) U.S. Cl.
    CPC ......... *B60N 2/1864* (2013.01); *B60N 2/1867* (2013.01); *B60N 2/225* (2013.01); *F16H 19/08* (2013.01); *F16H 57/021* (2013.01); *B60N 2002/024* (2013.01); *B60N 2002/0236* (2013.01); *F16H 1/16* (2013.01)

(56) References Cited

U.S. PATENT DOCUMENTS

| | | | |
|---|---|---|---|
| 1,192,627 | A | 7/1916 | Hatlee |
| 1,694,031 | A | 12/1928 | Braren |
| 1,770,035 | A | 7/1930 | Heap et al. |
| 2,168,164 | A | 8/1939 | Kittredge |
| 2,170,951 | A | 8/1939 | Perry |
| 2,250,259 | A | 7/1941 | Foote, Jr. |
| 2,475,504 | A | 7/1949 | Jackson |
| 2,508,121 | A | 5/1950 | McIver |
| 2,609,713 | A | 9/1952 | Martin |
| 2,972,910 | A | 2/1961 | Menge, Sr. |
| 2,995,226 | A | 8/1961 | Gilder |
| 3,013,447 | A | 12/1961 | Hils et al. |
| 3,037,400 | A | 6/1962 | Sundt |
| 3,144,791 | A | 8/1964 | Menge, Sr. |
| 3,427,901 | A | 2/1969 | Wildhaber |
| 3,451,290 | A | 6/1969 | Wildhaber |
| 4,023,441 | A | 5/1977 | Osterwalder |
| 4,228,698 | A | 10/1980 | Winiasz |
| 4,452,102 | A | 6/1984 | Shaffer |
| 4,967,615 | A | 11/1990 | Mills |
| 5,030,184 | A | 7/1991 | Rennerfelt |
| 5,425,683 | A | 6/1995 | Bang |
| 5,505,668 | A | 4/1996 | Koriakov-Savoysky et al. |
| 6,261,199 | B1 | 7/2001 | Schlangen |
| 7,041,024 | B2 * | 5/2006 | Becker ................. B60N 2/0232 475/162 |
| 7,322,257 | B2 | 1/2008 | Becker et al. |
| 8,171,823 | B2 * | 5/2012 | Koga ................... B60N 2/0232 74/425 |
| 8,864,231 | B2 * | 10/2014 | Shimoda .............. B60N 2/0232 297/311 |
| 2005/0146174 | A1 | 7/2005 | Maddelein et al. |
| 2007/0029893 | A1 | 2/2007 | Schuler et al. |
| 2007/0209857 | A1 | 9/2007 | Wolf |
| 2008/0261743 | A1 | 10/2008 | Junkers |
| 2009/0045661 | A1 | 2/2009 | Stoessel et al. |
| 2010/0139425 | A1 | 6/2010 | Schulz et al. |
| 2010/0237216 | A1 | 9/2010 | Napau et al. |
| 2013/0180348 | A1 | 7/2013 | Andres et al. |
| 2013/0333496 | A1 | 12/2013 | Boutouil et al. |

FOREIGN PATENT DOCUMENTS

| | | |
|---|---|---|
| FR | 679410 A | 4/1930 |
| WO | WO-2010/116125 A1 | 10/2010 |
| WO | WO 2011/137989 A1 | 11/2011 |
| WO | WO-2012/150050 A1 | 11/2012 |
| WO | WO-2013/010888 A2 | 1/2013 |

OTHER PUBLICATIONS

International Search Report for PCT/US2016/048634; dated Dec. 21, 2016; 3 pp.

* cited by examiner

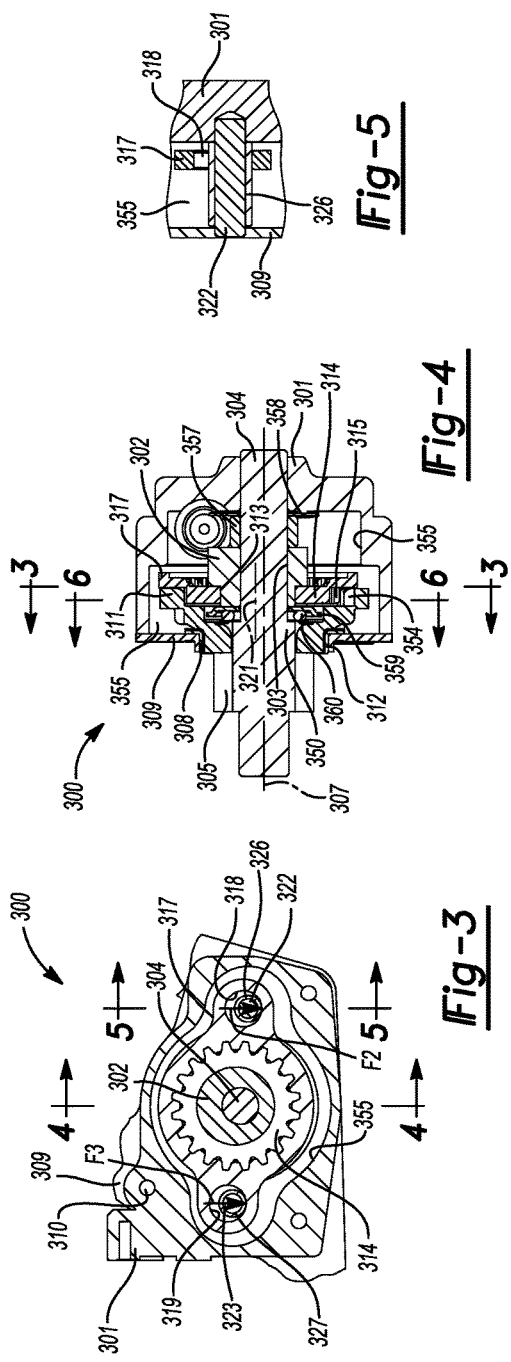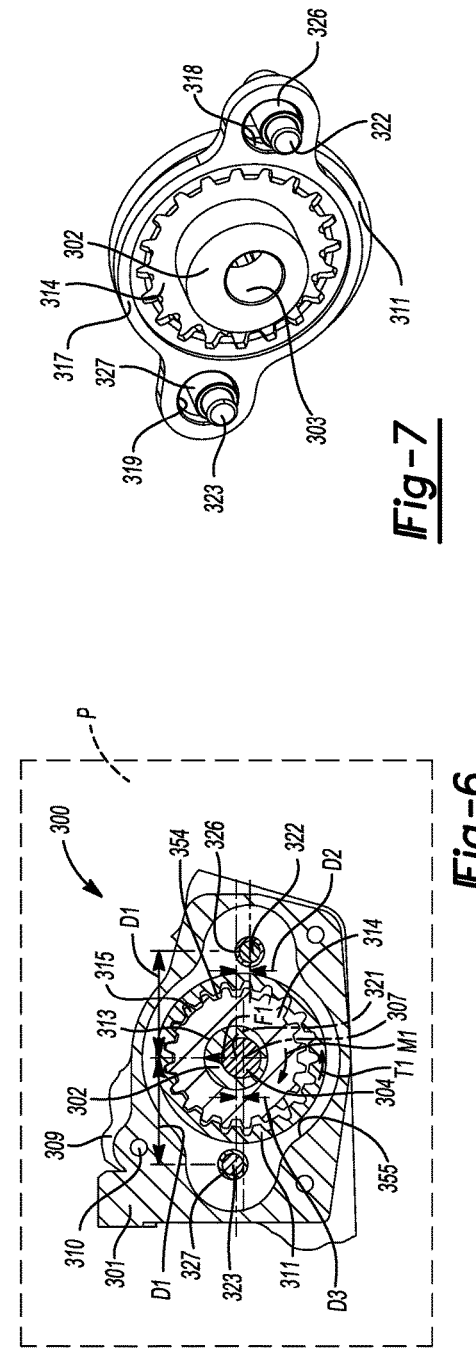

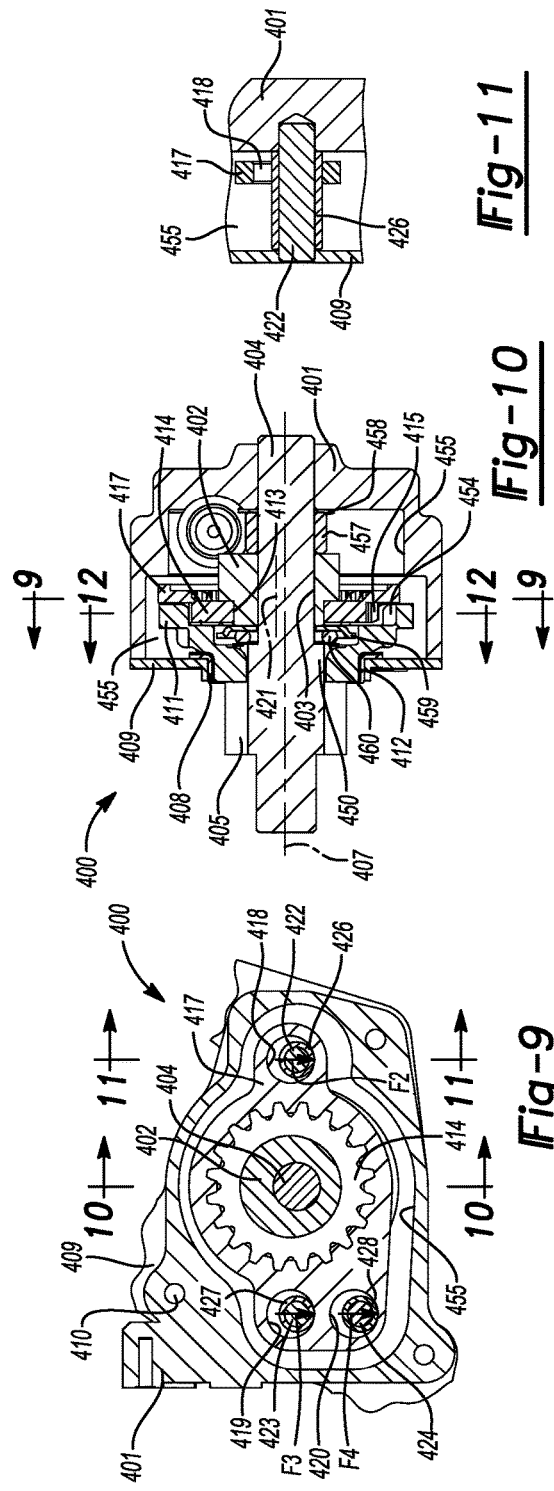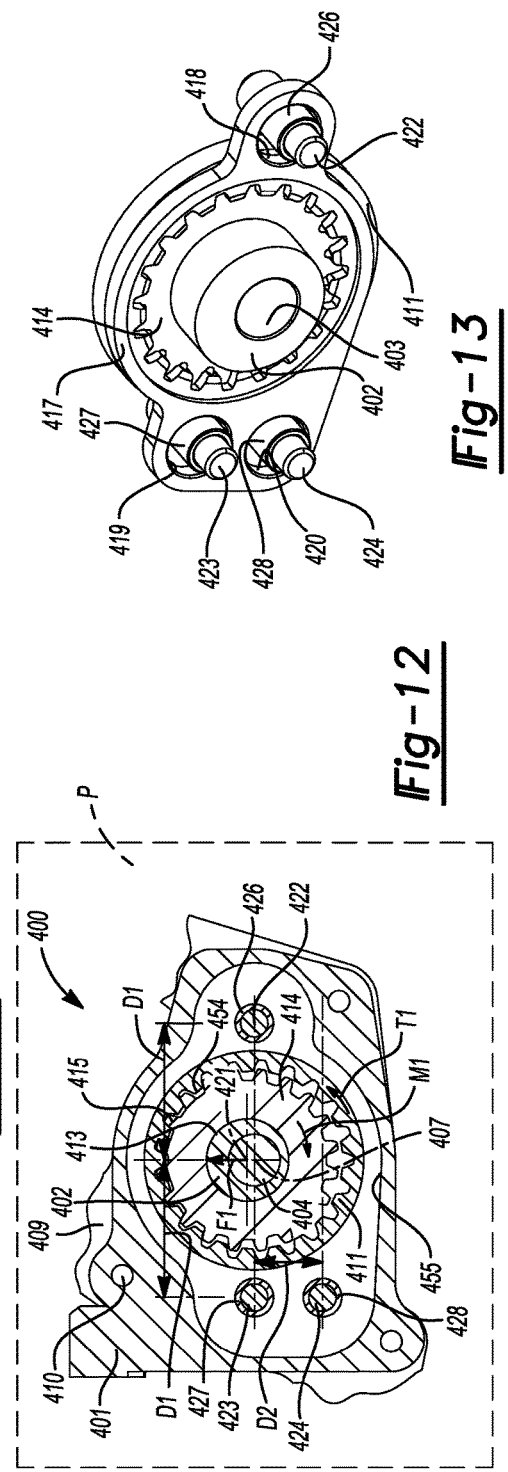

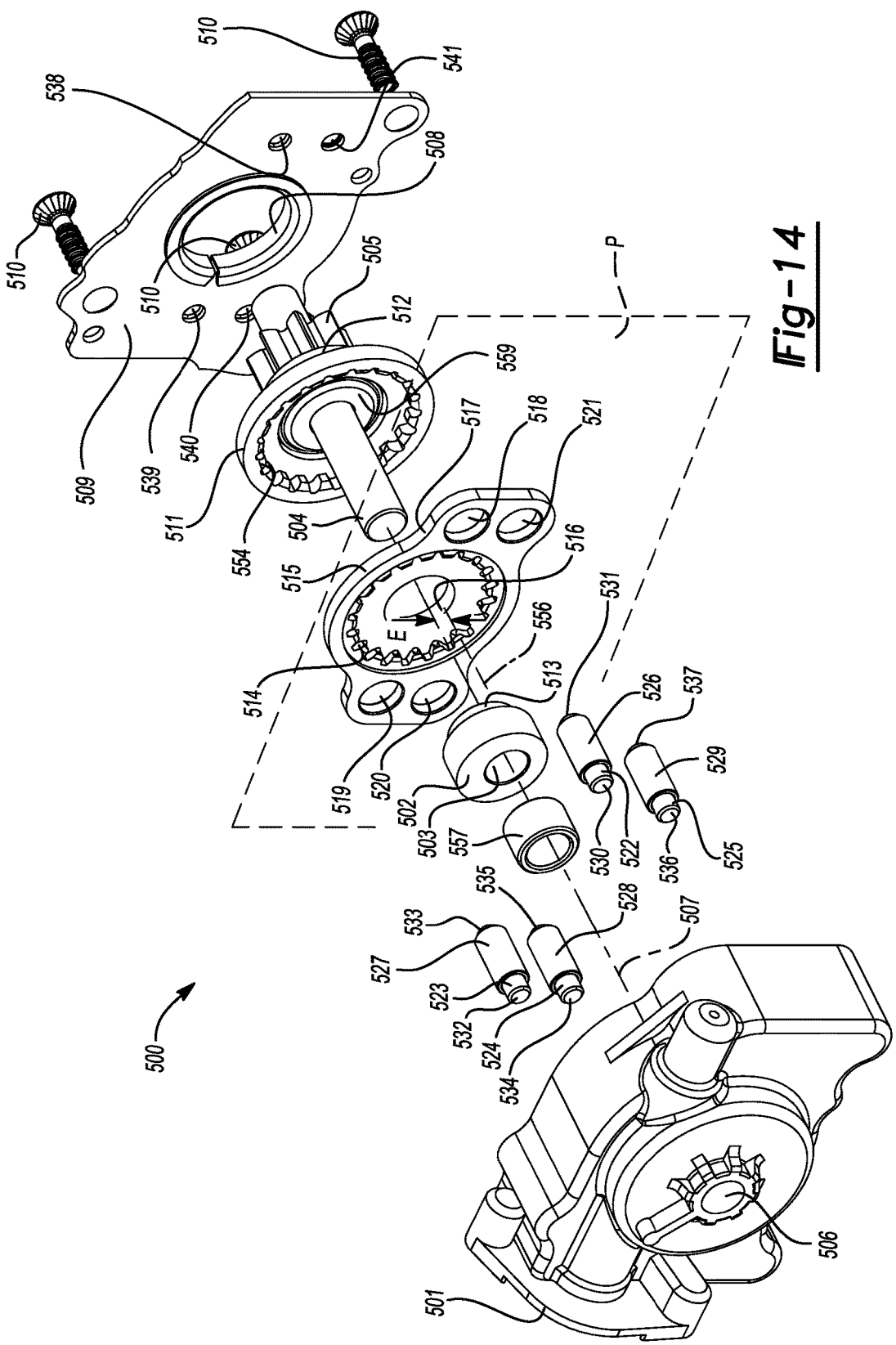

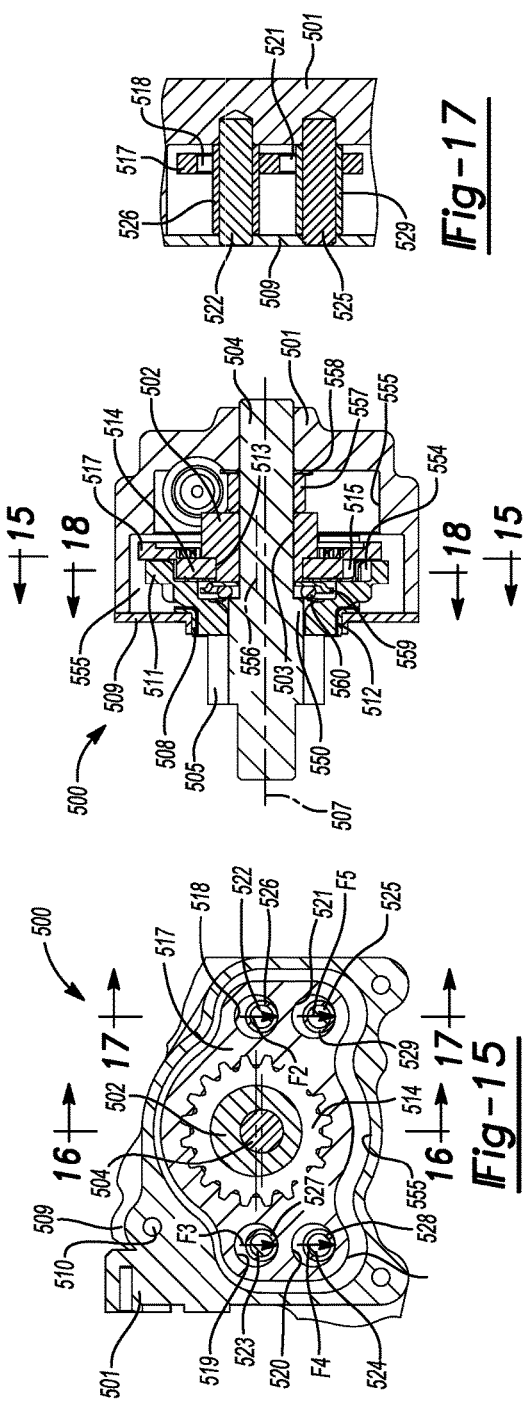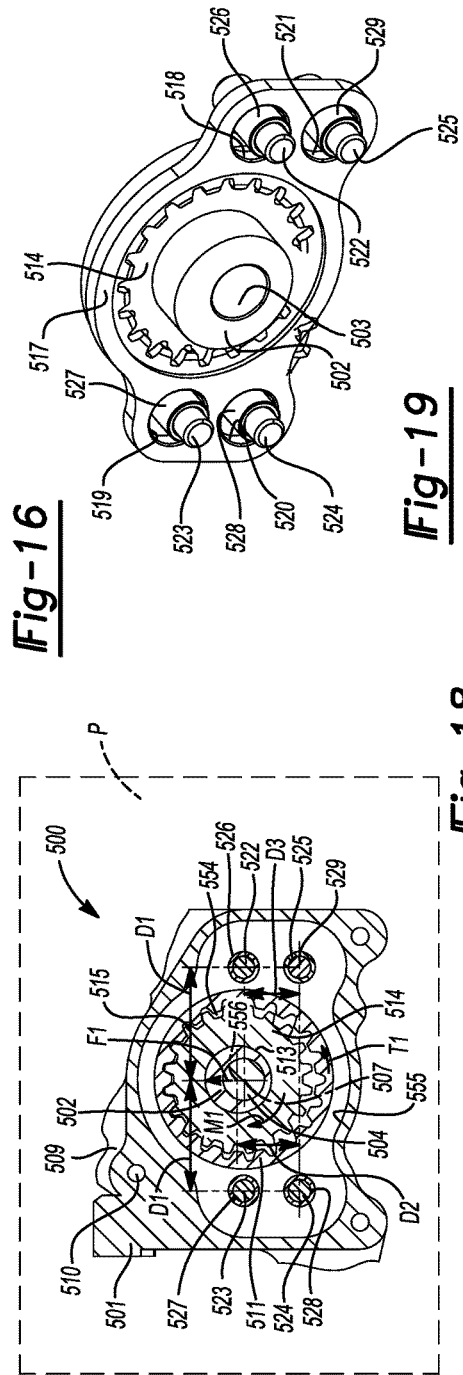

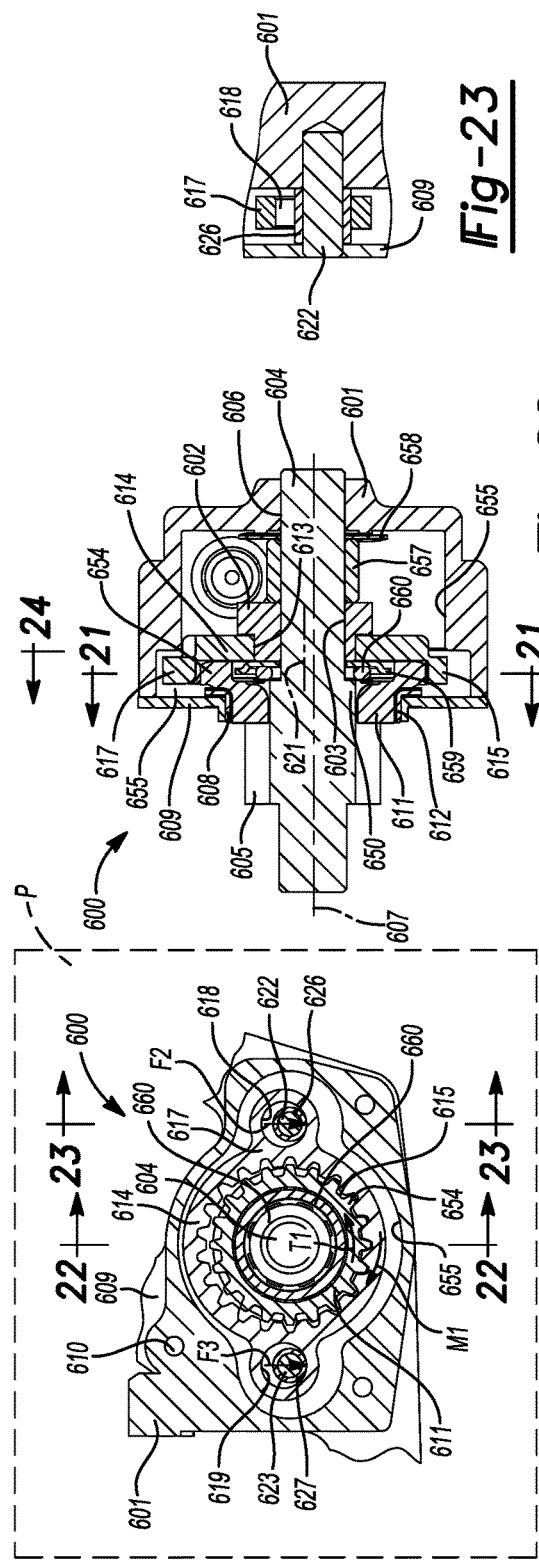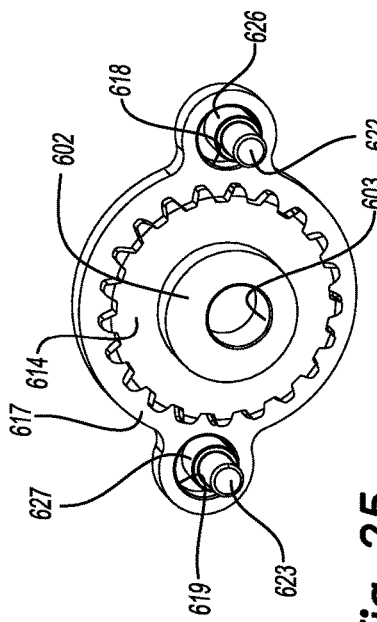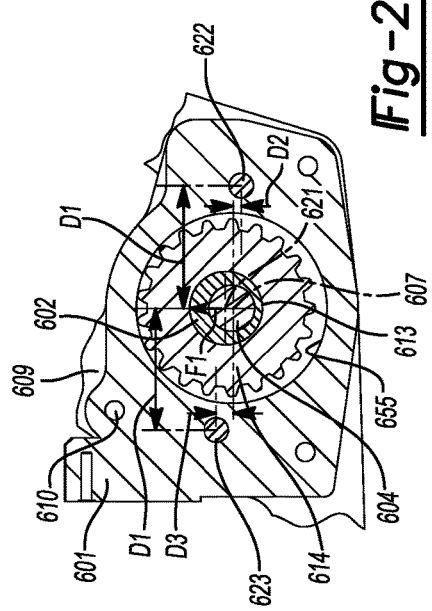

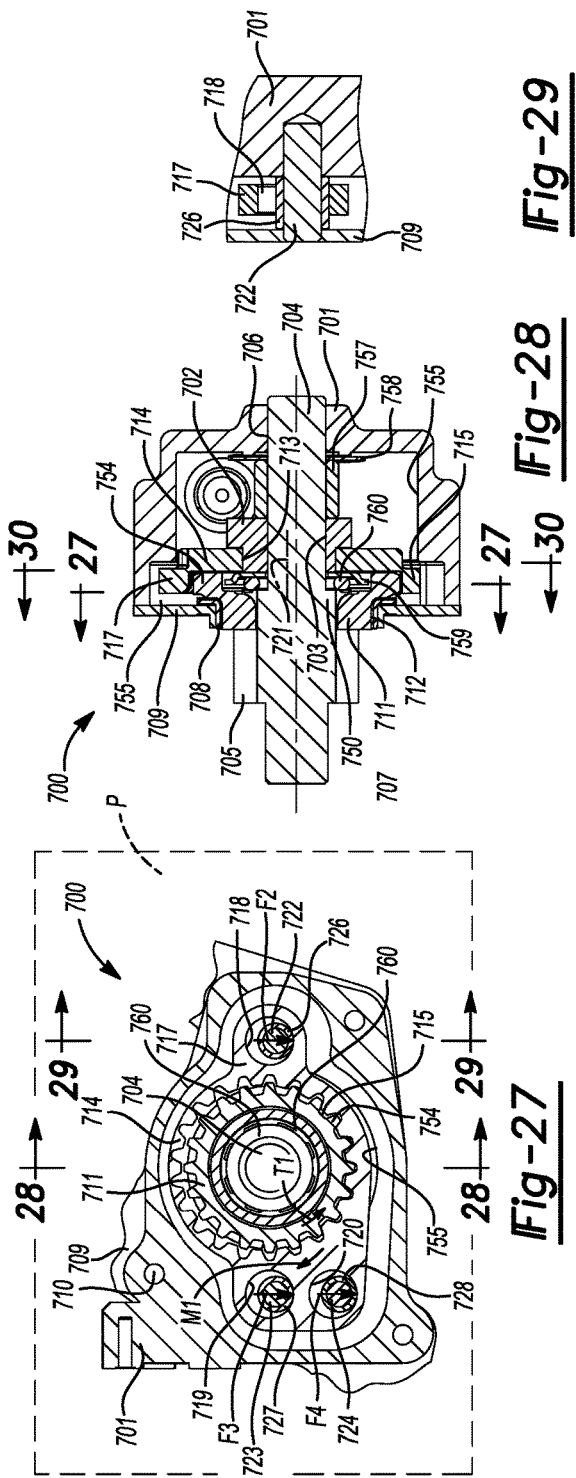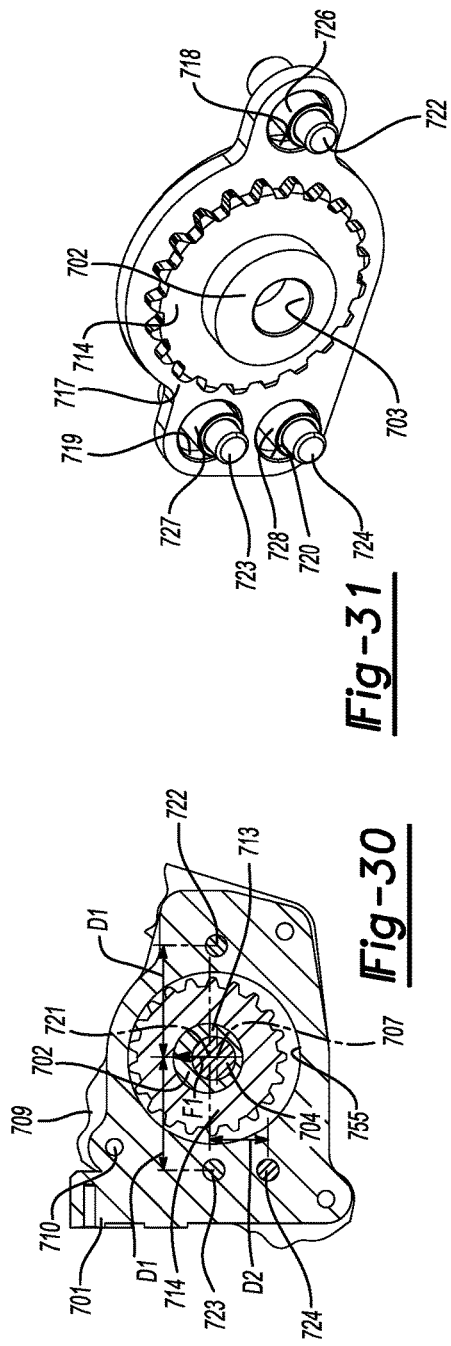

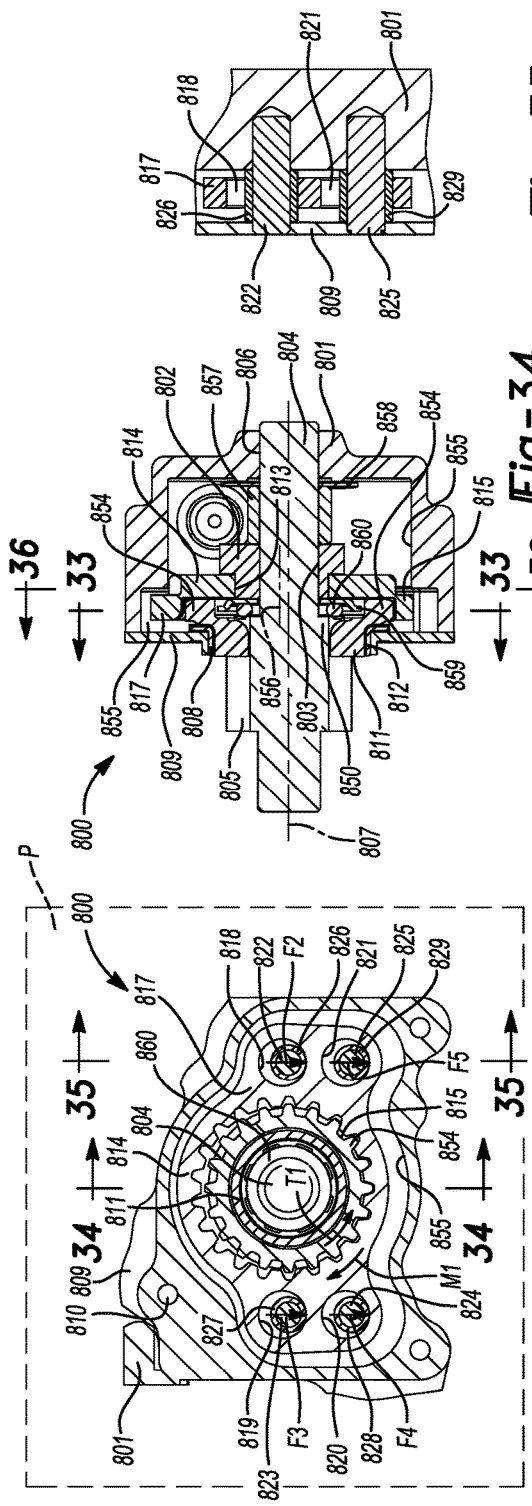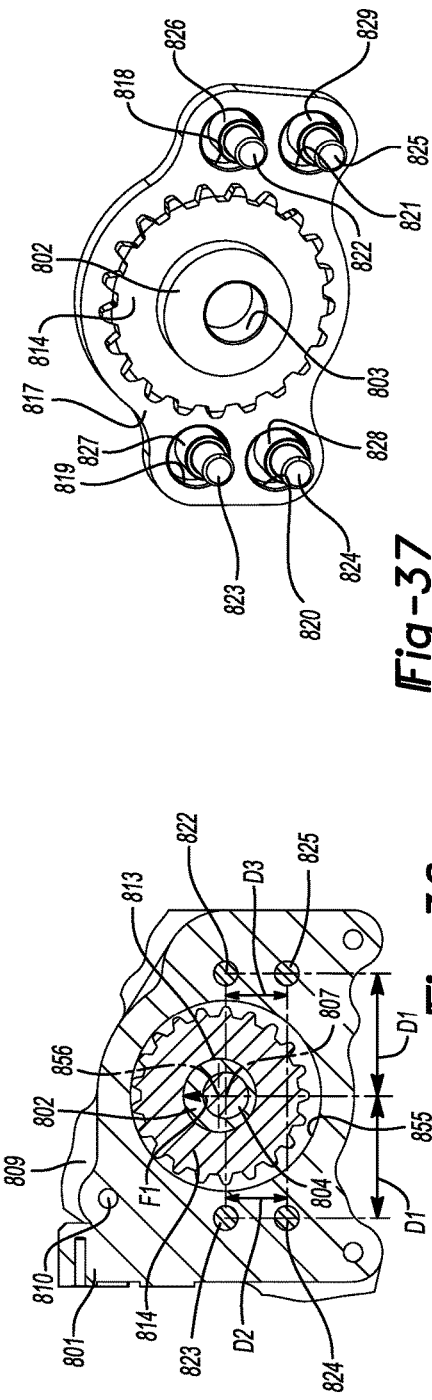

SINGLE-STAGE GEAR REDUCTION OUTPUT MECHANISM HAVING A LOCKING GEAR WITH PIN RECEIVING GUIDE HOLES AND ANTI-BACK DRIVE CAPABILITY FOR AUTOMOTIVE SEAT ADJUSTER DRIVES

CROSS-REFERENCE TO RELATED APPLICATIONS

This application claims the benefit of U.S. Provisional Application No. 62/209,602, filed on Aug. 25, 2015. The entire disclosure of the above application is incorporated herein by reference.

FIELD

The present disclosure generally relates to automotive seat adjuster drives. More specifically, a single-stage gear reduction output mechanism for an automotive seat adjuster drive is disclosed.

BACKGROUND

This section provides background information related to the present disclosure which is not necessarily prior art.

There are an increasing number of electrical actuators in today's vehicles. By way of example and without limitation, electrical actuators may be utilized to power windows, rear-view mirrors, seats, windshield wipers, antennas, spoilers, convertible rooves, hoods, oil pumps, and water pumps. Electrical actuators are driven by electric motors, the size of which is selected according to the torque it must provide to produce the required motion. Thus, if a reasonably high reduction gear ratio can be achieve in a very limited space, smaller and faster electric motors can be used to provide the same level of mechanical power needed for the required motion.

Generally speaking, gear drives used in automotive interior actuators can perform several useful functions: reduce or increase the speed, multiply or decrease the torque, and reverse the direction of rotation. In one example, automotive seat adjuster drives are gear drives that provide seat height adjustment and/or seat tilt position adjustment in automotive vehicles. Automotive seat adjuster drives serve to reduce the electric motor input speed while increasing the input torque. Some of the most important requirements for automotive seat adjuster drives include: the range of reduction ratio, the range of output torque, size, weight, efficiency, the level of noise produced by the automotive seat adjuster drive, shock load capability, cost, durability, and the amount of backlash. For some applications, such as those used in adjusting and maintaining the adjusted position of a vehicle seat, a special requirement called anti-back drive capability is also required. Anti-back drive capability may also be referred to as "non-back drive capability," "self-locking capability," or "anti-regression capability." Gear drives transfer the high speed and low torque rotation of an electric motor input shaft to low speed and high torque rotation of an output shaft, in either, a clockwise (CW) or a counter-clockwise (CCW) direction of rotation. For gear drives with anti-back drive capability, any attempt to transfer torque from the output shaft back to the input shaft by applying an external load (e.g. occupant weight or external reaction forces in the case of a crash accident, etc.) to the output shaft is prevented. This protects against damage to the electric motor and ensures that the vehicle seat maintains its position when the electric motor is not energized.

Gear drives with anti-back drive capabilities have been developed that multiply the torque and reduce the speed in either a clockwise or a counter-clockwise direction of rotation. Worm and worm-wheel gear drives have been used successfully for many years as a safety or self-locking device. Worm and worm-wheel gear drives avoid the need for an external brake or clutch mechanism. However, the disadvantages of worm and worm-wheel gear drives are that the anti-back drive capability is achieved only if the reduction ratio is on the order of 25:1 or larger, leading to a relatively low mechanical efficiency. Theoretically, the maximum efficiency of worm and worm-wheel gear drives with anti-back drive capability is 50 percent. Moreover, worm and worm-wheel gear drives may not provide anti-back drive capability in all operating conditions, such as in the presence of unwanted dynamic vibrations.

In addition to anti-back drive capability and an increased operating efficiency, gear reduction mechanisms used in vehicle seat height and tilt adjusters must have: a relatively high gear ratio, (typically in the range of 300:1 to 700:1), reduced packaging, reduced noise during operation, and low manufacturing and assembly costs. A practical solution for a coaxial or an orthogonal gear transmission that is able to meet all the above mentioned requirements using only a single-stage reduction mechanism is not possible. Thus, several gear drives are being pursued that utilize two-stages of gear reduction, in which the second-stage of gear reduction provides the necessary output torque and speed while preserving anti-back drive capability. Usually, such two-stage transmissions exploit the properties of single-stage planetary gear drives, which use an eccentric to drive a planetary gear for providing high gear ratios in a very compact space, and different coupling or compensating arrangements to prevent rotation of the planetary gear about its own axis of rotation to provide anti-back drive capability. Such coupling or compensating arrangements are based on a reciprocating sliding, rolling, or wedging action between the planetary gears and the housing or another component that is fixed to the housing.

The following patents and patent application publications EP0450324, U.S. Pats. No. 4,228,698, WO2012/150050, US2013/0180348 and US2007/0209857 disclose planetary gear reduction mechanisms where the coupling or compensating arrangements use reciprocating, sliding movements between adjacent elements during torque transmitting operations. Several other patents, including U.S. Pat. Nos. 5,425,683, 6,261,199, 3,013,447, 2,609,713, FR679410, U.S. Pat. Nos. 2,508,121, 2,995,226 and U.S. Pat. No. 4,967,615 disclose planetary gear reduction mechanisms where the coupling or compensating arrangements use rolling contact action between adjacent elements during torque transmitting operations. Although all of the aforementioned patents and patent application publications solve the main requirement related to anti-back drive capability, these solutions exhibit low overall mechanical efficiency, require a large packaging space, utilize heavy and complicated architectures, produce excessive noise, and/or are expensive to manufacture and assembled.

SUMMARY

This section provides a general summary of the disclosure and is not a comprehensive disclosure of its full scope or all of its features.

The subject disclosure provides for a single-stage gear reduction output mechanism for an automotive seat adjuster drive. The single-stage gear reduction output mechanism generally includes a gear housing bracket, a gear housing, an axle shaft, an eccentric, and first and second gears. The gear housing extends from the gear housing bracket to define a cavity. The axle shaft is disposed within the cavity and extends along an axis of rotation. The axle shaft is supported within the cavity of the gear housing such that the axle shaft is free to rotate about the axis of rotation. The eccentric is carried on the axle shaft. The eccentric includes a first bore and a first bearing surface. The first bore of the eccentric is concentric with the axle shaft and the first bearing surface of the eccentric is eccentric relative to the axle shaft. The axle shaft extends through the first bore in the eccentric with a slip fit such that the eccentric is free to rotate relative to the axle shaft.

The first gear is carried on the axle shaft and is rotatably coupled to the axle shaft such that the first gear rotates with the axle shaft about the axis of rotation. The second gear is carried on the first bearing surface of the eccentric and is disposed in meshing engagement with the first gear. The second gear includes a second bore and a centerline axis that extends co-axially through the second bore. The first bearing surface of the eccentric extends through the second bore in the second gear with a slip fit such that the eccentric is free to rotate relative to the second gear. The first gear and the second gear having a planetary arrangement where the centerline axis of the second gear is parallel to and spaced from the axis of rotation of the axle shaft.

The second gear further includes an external flange with first and second guide holes that extend through the external flange. The single-stage gear reduction output mechanism also includes first and second support pins that are rigidly fixed in place relative to the axle shaft. The first and second support pins are cylindrical in shape, are arranged at an orientation that is parallel to the axis of rotation of the axle shaft, and are spaced from the axis of rotation of the axle shaft. The first support pin extends through the first guide hole in the external flange of the second gear. The second support pin extends through the second guide hole in the external flange of the second gear. The first and second guide holes have first and second guide hole radii and the first and second support pins have first and second support pin radii that are smaller than the first and second guide hole radii. Accordingly, the second gear is free to move in a planetary, wobbling movement about the axis of rotation in response to rotation of the eccentric. However, the contact between the first bearing surface of the eccentric and the second bore of the second gear, contact between the first support pin and the first guide hole of the external flange, and contact between the second support pin and the second guide hole of the external flange prevents the first gear from driving rotation of the second gear.

Advantageously, the single-stage gear reduction output mechanisms of the present disclosure provide several technical solutions in the field of single-stage gear reduction output mechanisms, used for vehicle seat height and/or tilt position adjustment. The present disclosure provides for single-stage gear reduction output mechanisms with anti-back drive capability and improved overall mechanical efficiency. The pin arrangement of the single-stage gear reduction output mechanisms disclosed herein improves efficiency by reducing friction losses and guarantees anti-back drive capability in all operating conditions. The estimated range of overall efficiency improvement is between seven and fifteen percent compared to conventional anti-back drive transmissions. In addition to efficiency improvements, the single-stage gear reduction output mechanisms of the present disclosure are very compact, have reasonable weight, good durability, quiet operation, are easy to assemble, and have competitive manufacturing costs.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 3 is a front cross-sectional view of the exemplary single-stage gear reduction output mechanism shown in FIG. 2 taken along the line 3-3 in FIG. 4;

FIG. 4 is a side cross-sectional view of the exemplary single-stage gear reduction output mechanism shown in FIG. 2 taken along the line 4-4 in FIG. 3;

FIG. 5 is a side cross-sectional view of one of the two pins of the exemplary single-stage gear reduction output mechanism shown in FIG. 2, which is taken along the line 5-5 in FIG. 3;

FIG. 6 is another front cross-sectional view of the exemplary single-stage gear reduction output mechanism shown in FIG. 2 taken along the line 6-6 in FIG. 4;

FIG. 7 is a front perspective view of the planetary gear and two pins of the exemplary single-stage gear reduction output mechanism shown in FIG. 2;

FIG. 9 is a front cross-sectional view of the exemplary single-stage gear reduction output mechanism shown in FIG. 8 taken along the line 9-9 in FIG. 10;

FIG. 10 is a side cross-sectional view of the exemplary single-stage gear reduction output mechanism shown in FIG. 8 taken along the line 10-10 in FIG. 9;

FIG. 11 is a side cross-sectional view of one of the three pins of the exemplary single-stage gear reduction output mechanism shown in FIG. 8, which is taken along the line 11-11 in FIG. 9;

FIG. 12 is another front cross-sectional view of the exemplary single-stage gear reduction output mechanism shown in FIG. 8 taken along the line 12-12 in FIG. 10;

FIG. 13 is a front perspective view of the planetary gear and three pins of the exemplary single-stage gear reduction output mechanism shown in FIG. 8;

FIG. 14 is a front perspective exploded view of another exemplary single-stage gear reduction output mechanism constructed in accordance with the present disclosure that includes a planetary gear with external teeth retained by four pins extending from a gear housing of the single-stage gear reduction output mechanism;

FIG. 15 is a front cross-sectional view of the exemplary single-stage gear reduction output mechanism shown in FIG. 14 taken along the line 15-15 in FIG. 16;

FIG. 16 is a side cross-sectional view of the exemplary single-stage gear reduction output mechanism shown in FIG. 14 taken along the line 16-16 in FIG. 15;

FIG. 17 is a side cross-sectional view of two of the four pins of the exemplary single-stage gear reduction output mechanism shown in FIG. 14, which is taken along the line 17-17 in FIG. 15;

FIG. 18 is another front cross-sectional view of the exemplary single-stage gear reduction output mechanism shown in FIG. 14 taken along the line 18-18 in FIG. 16;

FIG. 19 is a front perspective view of the planetary gear and four pins of the exemplary single-stage gear reduction output mechanism shown in FIG. 14;

FIG. 21 is a front cross-sectional view of the exemplary single-stage gear reduction output mechanism shown in FIG. 20 taken along the line 21-21 in FIG. 22;

FIG. 22 is a side cross-sectional view of the exemplary single-stage gear reduction output mechanism shown in FIG. 20 taken along the line 22-22 in FIG. 21;

FIG. 23 is a side cross-sectional view of one of the two pins of the exemplary single-stage gear reduction output mechanism shown in FIG. 20, which is taken along the line 23-23 in FIG. 21;

FIG. 24 is another front cross-sectional view of the exemplary single-stage gear reduction output mechanism shown in FIG. 20 taken along the line 24-24 in FIG. 22;

FIG. 25 is a front perspective view of the planetary gear and two pins of the exemplary single-stage gear reduction output mechanism shown in FIG. 20;

FIG. 27 is a front cross-sectional view of the exemplary single-stage gear reduction output mechanism shown in FIG. 26 taken along the line 27-27 in FIG. 28;

FIG. 28 is a side cross-sectional view of the exemplary single-stage gear reduction output mechanism shown in FIG. 26 taken along the line 28-28 in FIG. 27;

FIG. 29 is a side cross-sectional view of one of the three pins of the exemplary single-stage gear reduction output mechanism shown in FIG. 26, which is taken along the line 29-29 in FIG. 27;

FIG. 30 is another front cross-sectional view of the exemplary single-stage gear reduction output mechanism shown in FIG. 26 taken along the line 30-30 in FIG. 28;

FIG. 31 is a front perspective view of the planetary gear and three pins of the exemplary single-stage gear reduction output mechanism shown in FIG. 26;

FIG. 33 is a front cross-sectional view of the exemplary single-stage gear reduction output mechanism shown in FIG. 32 taken along the line 33-33 in FIG. 34;

FIG. 34 is a side cross-sectional view of the exemplary single-stage gear reduction output mechanism shown in FIG. 32 taken along the line 34-34 in FIG. 33;

FIG. 35 is a side cross-sectional view of two of the four pins of the exemplary single-stage gear reduction output mechanism shown in FIG. 32, which is taken along the line 35-35 in FIG. 33;

FIG. 36 is another front cross-sectional view of the exemplary single-stage gear reduction output mechanism shown in FIG. 32 taken along the line 36-36 in FIG. 34; and FIG. 37 is a front perspective view of the planetary gear and four pins of the exemplary single-stage gear reduction output mechanism shown in FIG. 32.

DETAILED DESCRIPTION

Figure 1:
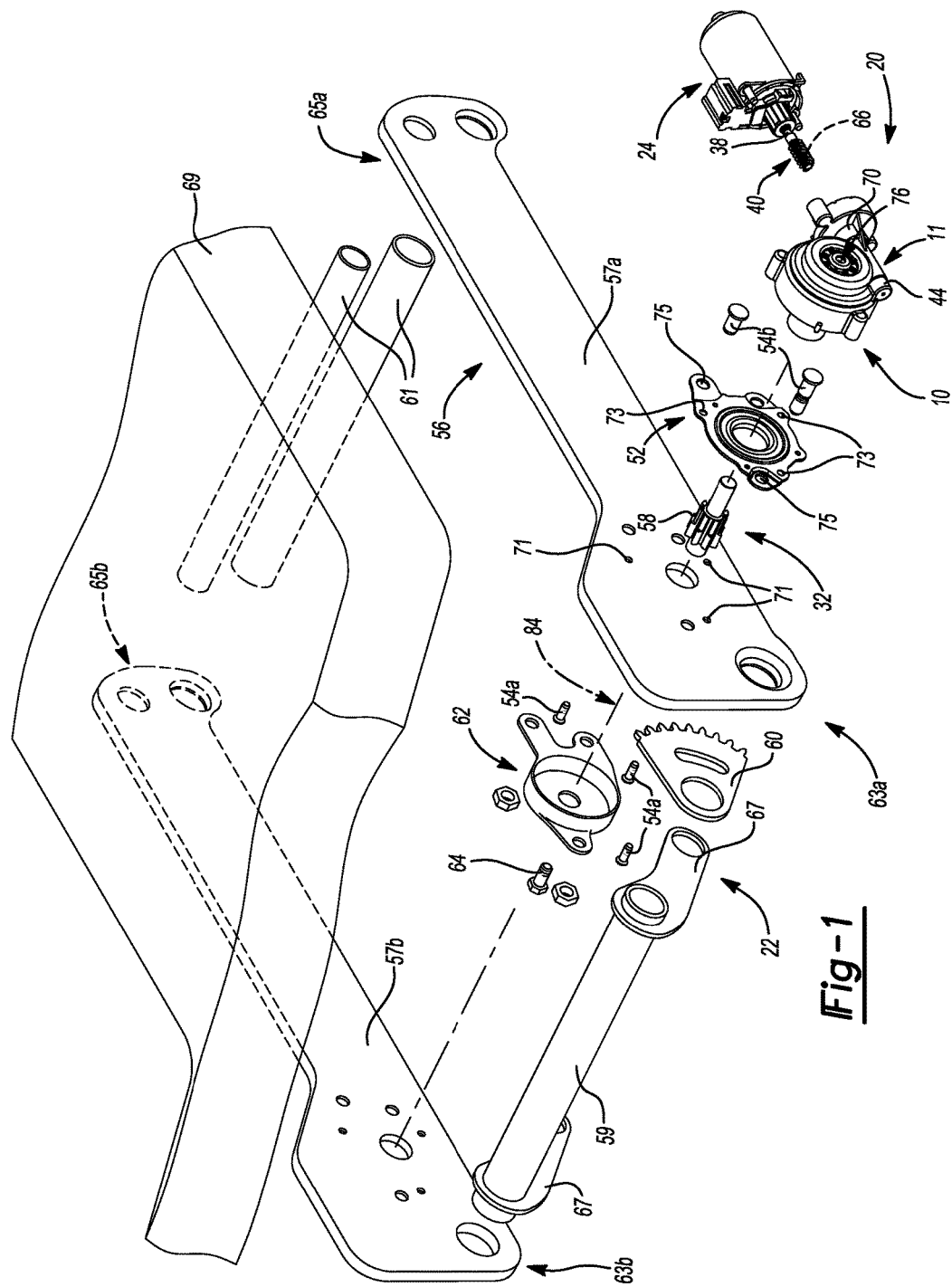
FIG. 1 is a perspective exploded view of an exemplary automotive seat assembly including an actuator and an exemplary single-stage gear reduction output mechanism constructed in accordance with the present disclosure.
Figure 2:
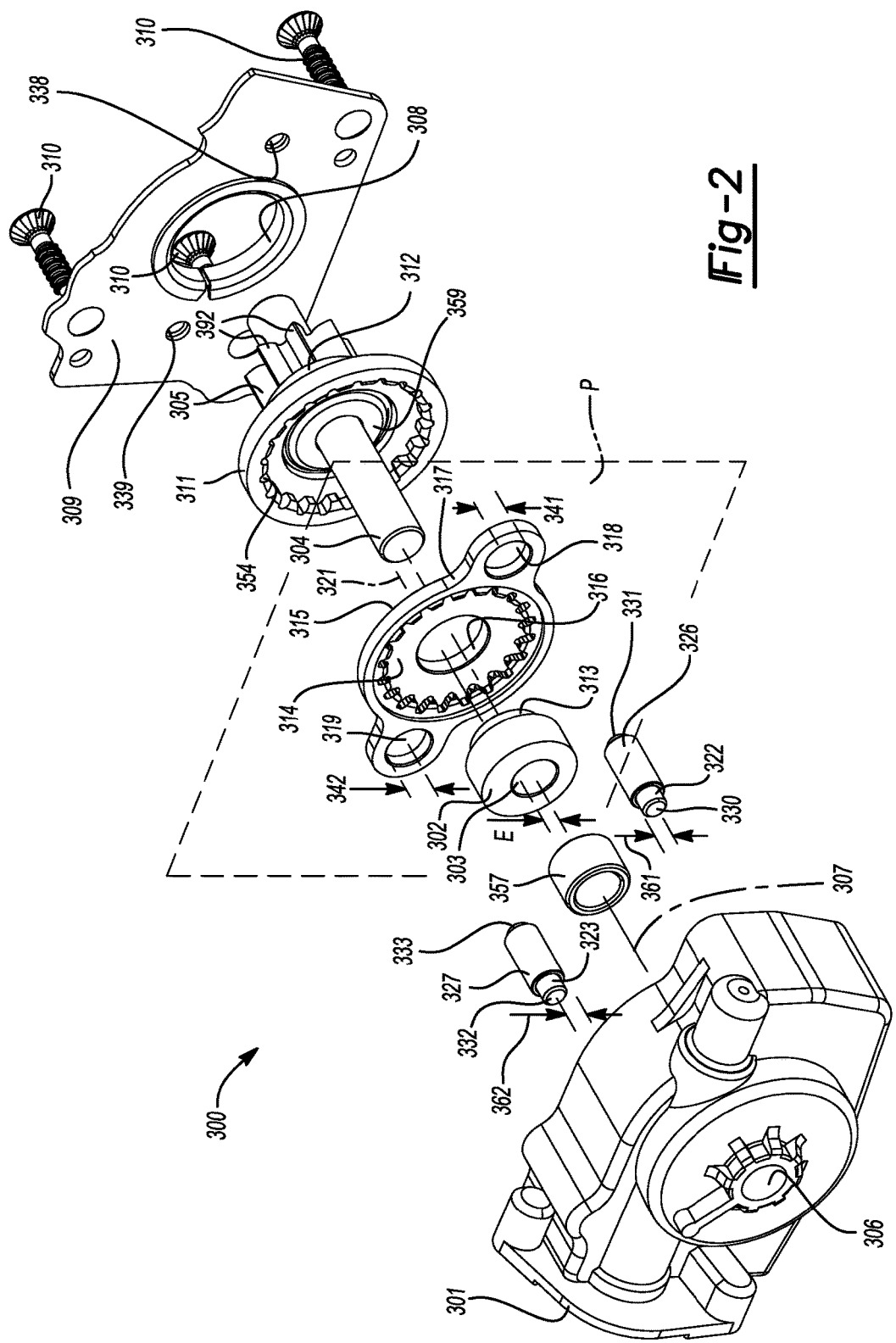
FIG. 2 is a front perspective exploded view of an exemplary single-stage gear reduction output mechanism constructed in accordance with the present disclosure that includes a planetary gear with external teeth retained by two pins extending from a gear housing of the single-stage gear reduction output mechanism.
Figure 8:
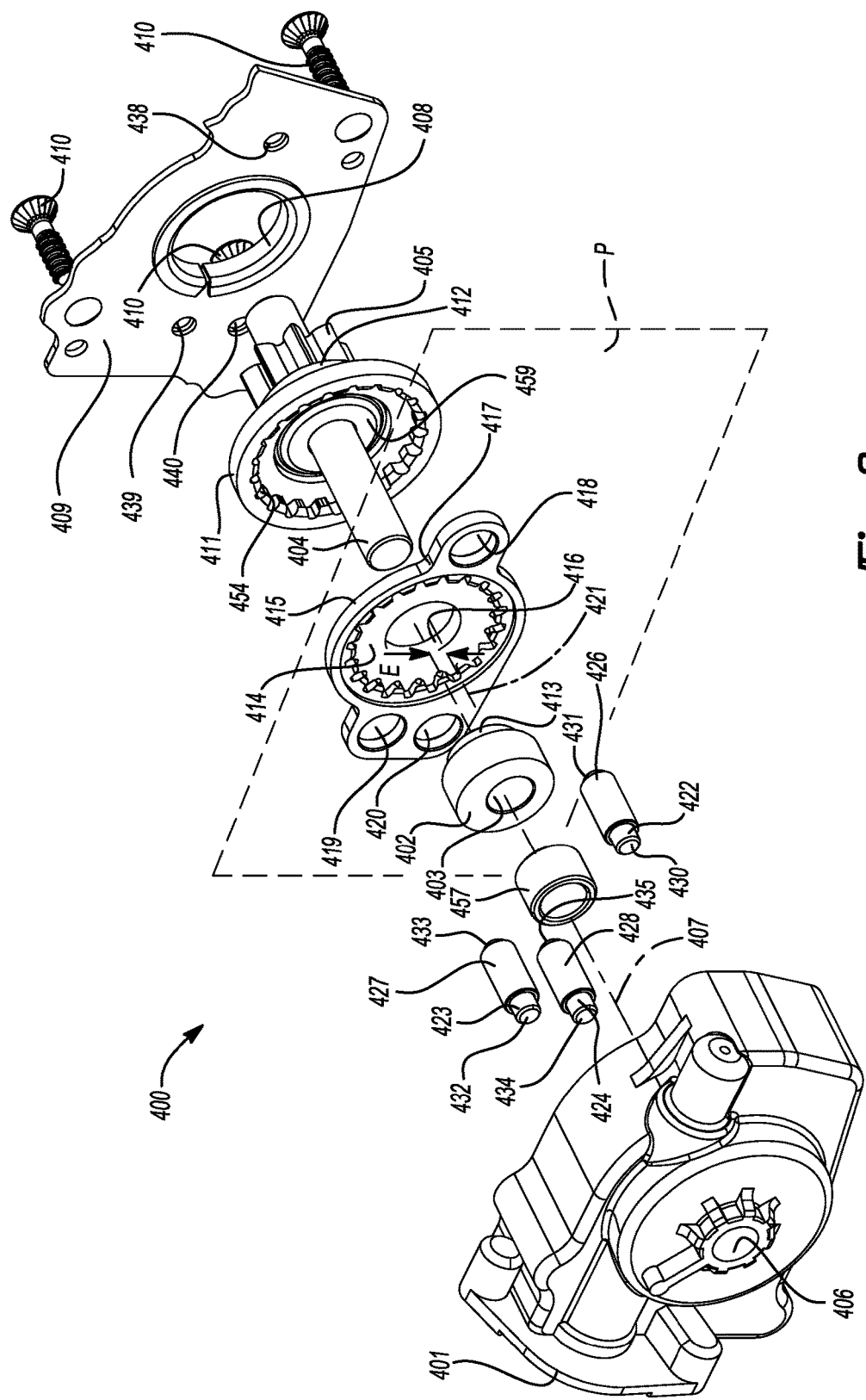
FIG. 8 is a front perspective exploded view of another exemplary single-stage gear reduction output mechanism constructed in accordance with the present disclosure that includes a planetary gear with external teeth retained by three pins extending from a gear housing of the single-stage gear reduction output mechanism.
Figure 20:
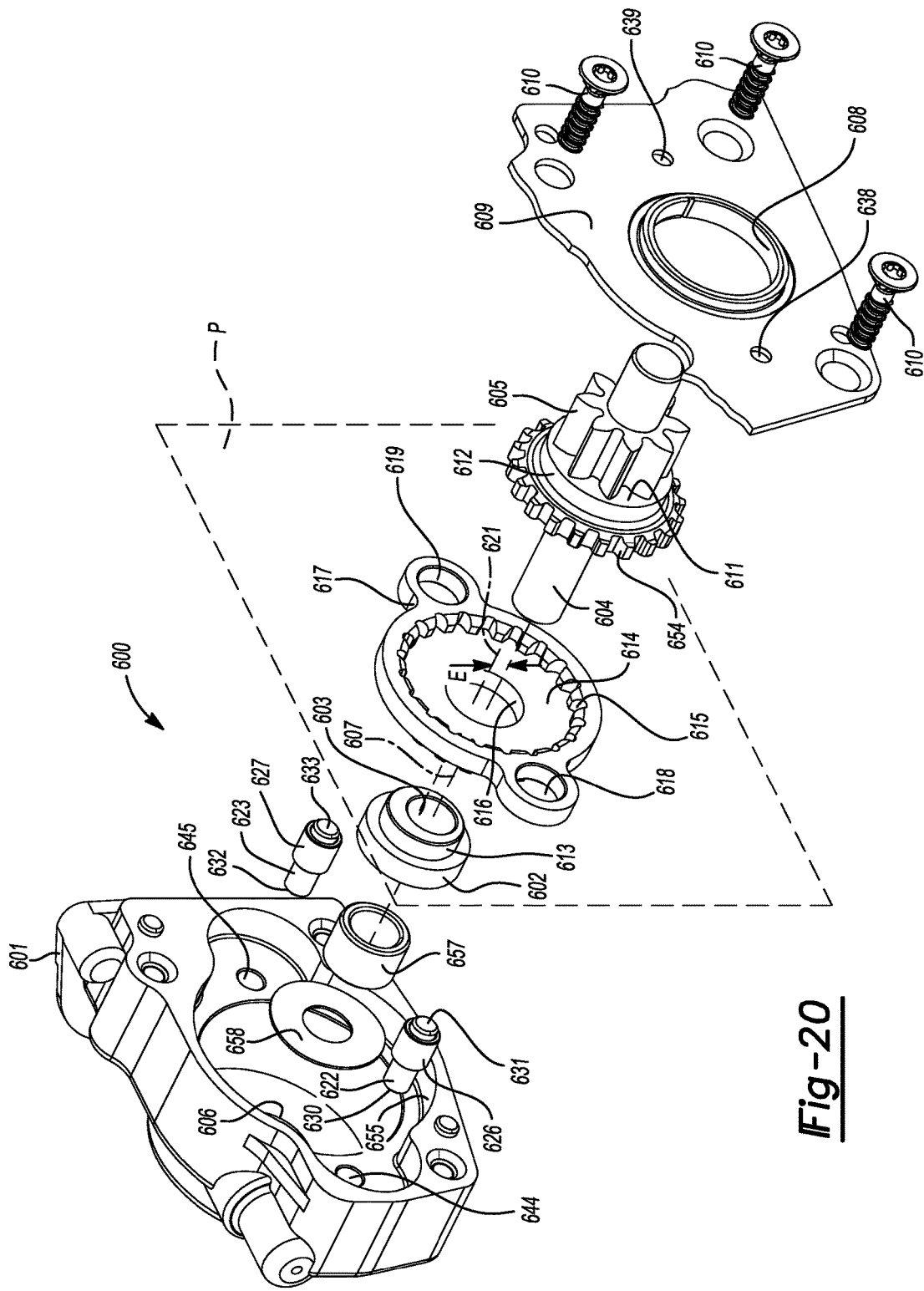
FIG. 20 is a rear perspective exploded view of another exemplary single-stage gear reduction output mechanism constructed in accordance with the present disclosure that includes a planetary gear with internal teeth retained by two pins extending from a gear housing of the single-stage gear reduction output mechanism.
Figure 26:
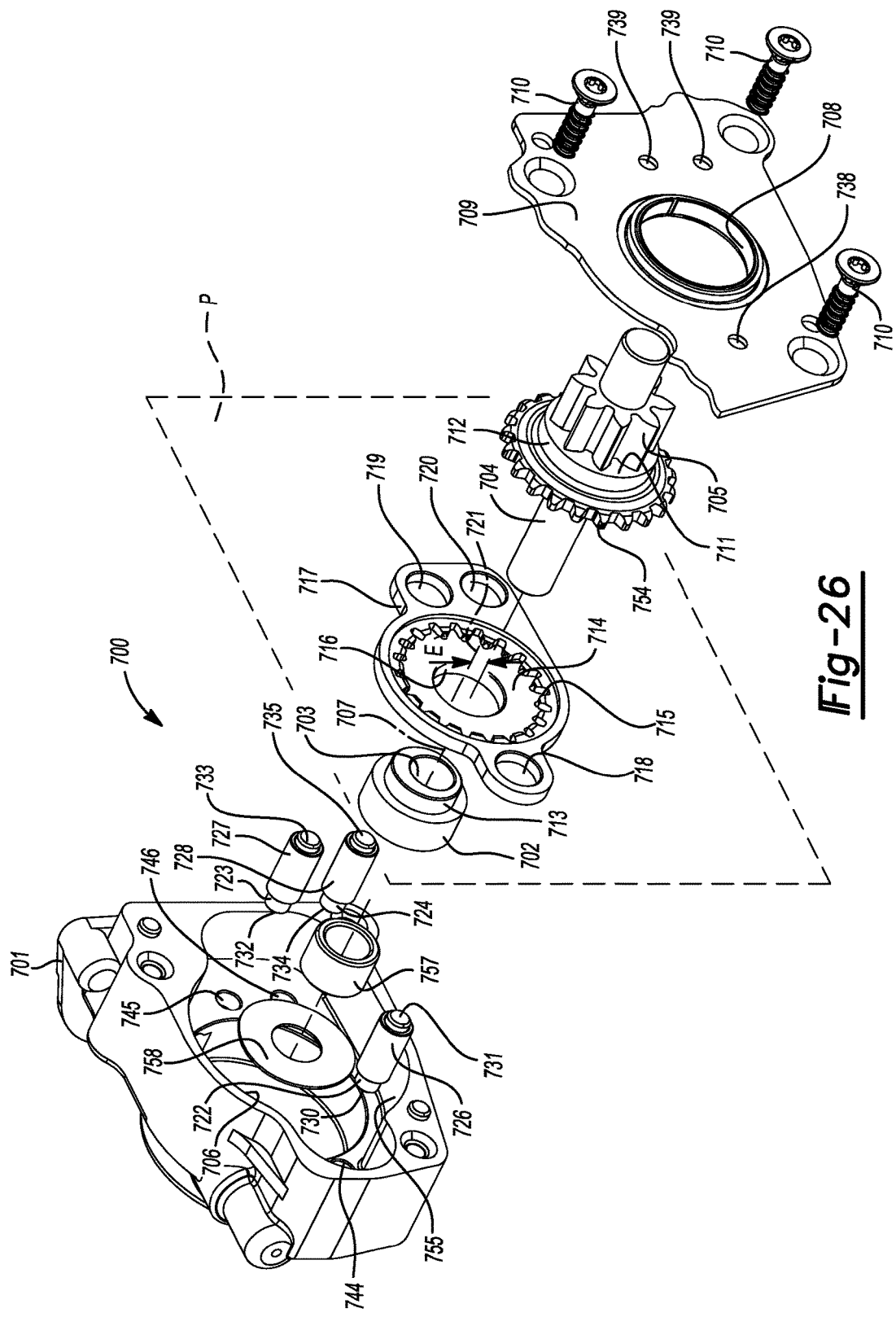
FIG. 26 is a rear perspective exploded view of another exemplary single-stage gear reduction output mechanism constructed in accordance with the present disclosure that includes a planetary gear with internal teeth retained by three pins extending from a gear housing of the single-stage gear reduction output mechanism.
Figure 32:
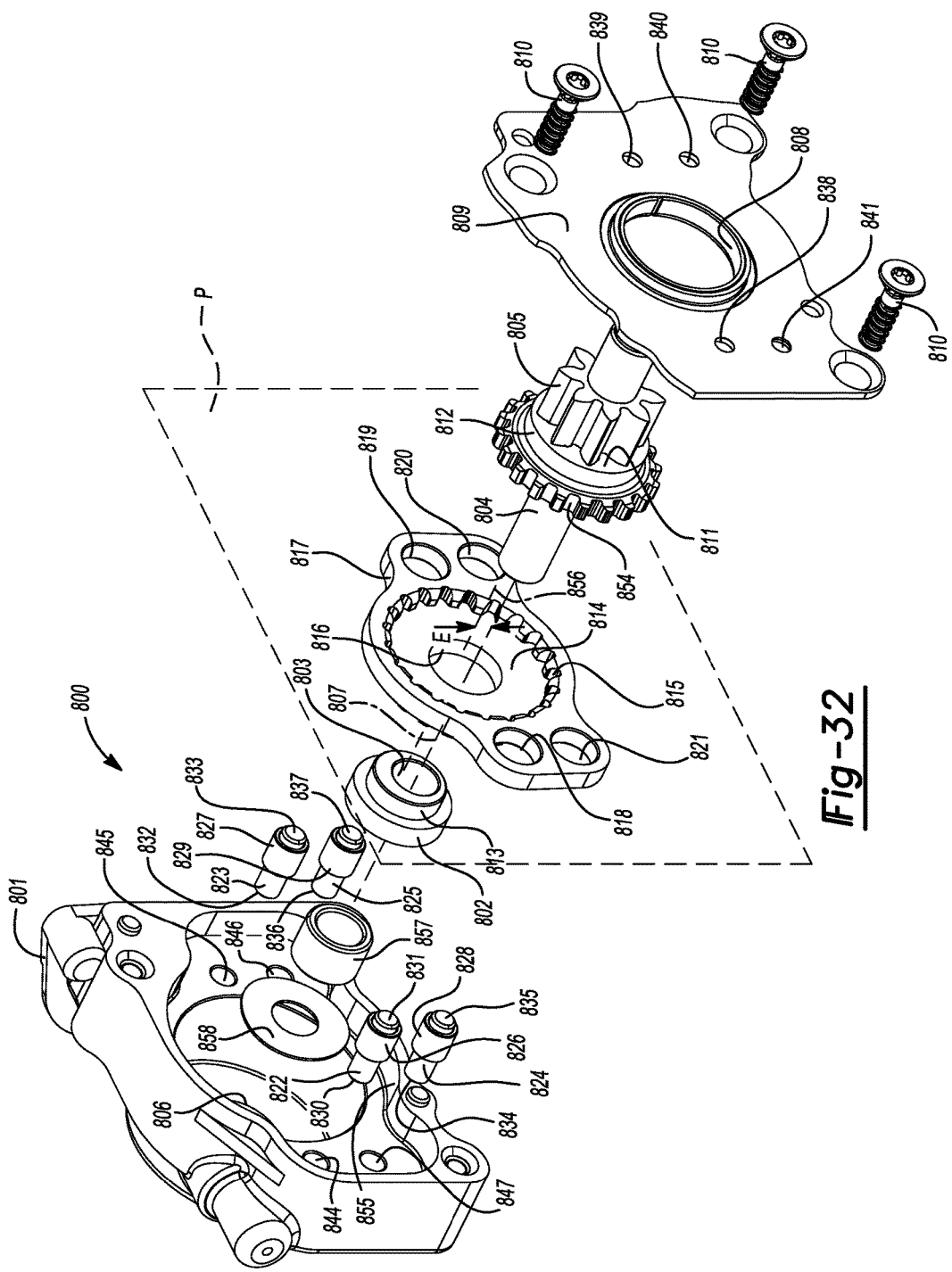
FIG. 32 is a rear perspective exploded view of another exemplary single-stage gear reduction output mechanism constructed in accordance with the present disclosure that includes a planetary gear with internal teeth retained by four pins extending from a gear housing of the single-stage gear reduction output mechanism.

Referring to the Figures, wherein like numerals indicate corresponding parts throughout the several views, several single-stage gear reduction output mechanisms 10, 300, 400, 500, 600, 700, 800 for an automotive seat adjuster drive 20 are disclosed.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIG. 1, the automotive seat adjuster drive 20 is shown in combination with an automotive seat assembly 22. The automotive seat adjuster drive 20 includes an actuator 24 that drives a single-stage gear reduction output mechanism 10. The actuator 24 includes a rotatable shaft 38 and a worm 40 that rotates with the rotatable shaft 38. The actuator 24 is mounted to a gear housing 11. The rotatable shaft 38 of the actuator 24 is received within a worm receptacle 44 of the gear housing 11. The gear housing 11 is connected to a gear housing bracket 52 with a plurality of fasteners 54a. The gear housing bracket 52 attaches to a frame 56 of the automotive seat assembly 22 with fasteners 54b. The frame 56 includes two side plates 57a, 57b that are spaced apart from one another. The gear housing bracket 52 supports the single-stage gear reduction output mechanism 10 and holds the single-stage gear reduction output mechanism 10 on one of the side plates 57a of the frame 56 of the automotive seat assembly 22.

The frame 56 further includes a rear cross-member 59 and one or more front cross-members 61. The two side plates 57a, 57b extend between a pair of rearward ends 63a, 63b and a pair of forward ends 65a, 65b. The rear cross-member 59 extends across the frame 56 between the pair of rearward ends 63a, 63b of the two side plates 57a, 57b and the front cross-members 61 extend across the frame 56 between the pair of forward ends 65a, 65b of the two side plates 57a, 57b. The pair of forward ends 65a, 65b of the two side plates 57a, 57b are designed to be pivotally connected to a vehicle floor (not shown). The rear cross-member 59 of the frame 56 is pivotally connected to the pair of rearward ends 63a, 63b of the frame 56 and includes one or more links 67 that are rotatably fixed with the rear cross-member 59. The links 67 are designed to be pivotally connected to the vehicle floor. The single-stage gear reduction output mechanism 10 includes a pinion member 32 with a splined portion 58 that meshes with a sector gear 60 of the automotive seat assembly 22. The sector gear 60 is rotatably fixed with the rear cross-member 59. Therefore, it should be appreciated that rotation of the pinion member 32 causes the sector gear 60 to pivot either up or down, which raises and lowers the frame 56 of the automotive seat assembly 22 relative to the vehicle floor. The automotive seat assembly 22 includes a vehicle seat 69 that is mounted to the frame 56 and that moves with the frame 56 in response to rotation of the pinion member 32.

The automotive seat assembly 22 also includes a crash bracket 62. The crash bracket 62 is mounted to one of the side plates 57a of the frame 56 of the automotive seat assembly 22. A bolt 64 extends through the crash bracket 62 and into the pinion member 32. The bolt 64 supports the pinion member 32 while still permitting the pinion member 32 to rotate relative to the crash bracket 62 and the frame 56 of the automotive seat assembly 20. Fasteners 54a extend through holes 71 in one of the side plates 57a of the frame 56, holes 73 in the gear housing bracket 52, and into the gear housing 11. Fasteners 54b extend through holes 75 in the gear housing bracket 52 and holes in one of the side plates 57a of the frame 56 and the crash bracket 62.

The actuator 24 in the illustrated example is an electric motor; however, it should be appreciated that the actuator 24 may take a variety of different forms without departing from the scope of the subject disclosure. By way of example and without limitation, the actuator 24 could be pneumatic, a manually operated knob, or a manually operated lever. In operation, the actuator 24 drives rotation of the rotatable shaft 38, which in turn drives rotation of the worm 40. The rotatable shaft 38 may be made of a variety of different materials, including without limitation, a metallic material. The rotatable shaft 38 generally extends away from the actuator 24 to a distal end 66. The worm 40 is rotatably fixed with the rotatable shaft 38 of the actuator 24 meaning that the worm 40 rotates with the rotatable shaft 38. While the worm 40 may be positioned on the rotatable shaft 38 at a variety of different locations, by way of example and without limitation, the worm 40 may be positioned at or near the distal end 66 of the rotatable shaft 38. The worm 40 may be integral with the rotatable shaft 38 of the actuator 24, or alternatively, the worm 40 may be a separate component that is mounted on or otherwise coupled to the rotatable shaft 38. The worm 40 has one or more screw-like teeth that wrap around the rotatable shaft 38 in a spiraling fashion.

With reference to FIGS. 2-7, a single-stage gear reduction output mechanism 300 with anti-back drive capability and improved mechanical efficiency is illustrated. The single-stage gear reduction output mechanism 300 shown in FIGS. 2-7 can be used in place of the single-stage gear reduction output mechanism 10 shown in FIG. 1. The single-stage gear reduction output mechanism 300 includes a gear housing 301. By way of example and without limitation, the gear housing 301 may be made from a rigid material such as plastic. The single-stage gear reduction output mechanism 300 further includes an eccentric 302. The eccentric 302 is rotatably driven by the actuator 24 shown in FIG. 1. Although various arrangements are possible, the eccentric 302 may include gear teeth (not shown) that mesh with the worm 40 shown in FIG. 1 to translate rotational movement of the rotatable shaft 38 of the actuator 24 shown in FIG. 1 to rotational movement of the eccentric 302. Alternatively, the eccentric 302 may be rotatably coupled to one or more input gears (not shown) that are driven by the actuator 24 shown in FIG. 1. By way of example and without limitation, the eccentric 302 may be made from plastic, metal, or powdered metal. The eccentric 302 includes a first bore 303. The first bore 303 of the eccentric 302 may be cylindrical in shape and may optionally include a metal insert (not shown) for increased wear resistance.

The eccentric 302 is rotatably supported on an axle shaft 304 that extends through the first bore 303 of the eccentric 302. There is a slip fit between the axle shaft 304 and the first bore 303 of the eccentric 302 such that the eccentric 302 can freely rotate on the axle shaft 304. The axle shaft 304 has an output pinion 305. The output pinion 305 may include integrally formed or rigidly connected pinion teeth 392 that are configured to engage the teeth of the sector gear 60 illustrated in FIG. 1. The axle shaft 304 extends co-axially along an axis of rotation 307 and may be made from a metal such as steel. The first bore 303 of the eccentric 302 is co-axially aligned with the axis of rotation 307 of the axle shaft 304 (i.e. is concentric with the axle shaft 304). The axle shaft 304 is rotatably supported by a central bearing surface 306 disposed within the gear housing 301. The single-stage gear reduction output mechanism 300 further includes a gear housing bracket 309. By way of example and without limitation, the gear housing bracket 309 may be made of stamped steel. The gear housing bracket 309 includes a bearing sleeve 308 that is aligned co-axially with the axis of rotation 307 of the axle shaft 304. The bearing sleeve 308 of the gear housing bracket 309 may be cylindrical in shape and may optionally be made from an anti-friction material such as a self-lubricated plastic material. The gear housing 301 may be rigidly fastened to the gear housing bracket 309 by fasteners 310.

The single-stage gear reduction output mechanism 300 includes a first gear 311. In FIGS. 2-7, the first gear 311 is rotatably coupled to the axle shaft 304. Although the first gear 311 may be rotatably coupled to the axle shaft 304 in a number of different ways, in the illustrated example, the first gear 311 is rotatably coupled to the output pinion 305 and thus the axle shaft 304 by splines 350. In FIGS. 2-7, the first gear 311 includes internal teeth 354 and has an external bearing surface 312. The external bearing surface 312 of the first gear 311 may be cylindrical in shape and extends through and contacts the bearing sleeve 308 of the gear housing bracket 309 such that the axle shaft 304 is rotatably supported at the gear housing bracket 309.

The eccentric 302 has a first bearing surface 313. As shown in FIGS. 2-7, the first bearing surface 313 is cylindrical in shape, is eccentric relative to the axle shaft 304, and has an eccentricity E. The single-stage gear reduction output mechanism 300 also includes a second gear 314. The first and second gears 311, 314 of the single-stage gear reduction output mechanism 300 are meshingly engaged in a planetary arrangement where one of the first and second gears 311, 314 travels in a planetary, wobbling motion within or about the other one of the first and second gears 311, 314. In FIGS. 2-7, the second gear 314 includes external teeth 315 that mesh with the internal teeth 354 of the first gear 311. Although different configuration are possible, the internal and external teeth 315, 354 of the first and second gears 311, 314 may have a cycloid profile. The first and second gears 311, 314 may be made of a variety of different materials. By way of example and without limitation, the first and second gears 311, 314 may be stamped metal. The second gear 314 is rotatably supported on the first bearing surface 313 of the eccentric 302. The second gear 314 has a second bore 316. The first bearing surface 313 of the eccentric 302 extends through and contacts the second bore 316 of the second gear 314. There is a slip fit between the first bearing surface 313 of the eccentric 302 and the second bore 316 of the second gear 314 such that the second gear 314 can freely rotate on the first bearing surface 313 of the eccentric 302. The second gear 314 has a centerline axis 321 that extends longitudinally through the second bore 316. The centerline axis 321 is parallel to the axis of rotation 307 of the axle shaft 304 and is spaced from the axis of rotation 307 by eccentricity E. Optionally, the eccentric 302 may have a metal insert (not shown) covering the first bearing surface 313 to minimize wear.

The single-stage gear reduction output mechanism 300 further includes first and second support pins 322, 323 that are fixed relative to the gear housing 301. The first and second support pins 322, 323 are spaced from and extend parallel to the axis of rotation 307 of the axle shaft 304. The first support pin 322 extends between a first support pin end 330 and a second support pin end 331. The second support pin 323 extends between a third support pin end 332 and a fourth support pin end 333. The first and second support pins 322,323 are rigidly fixed within the gear housing 301 at the first and third support pin ends 330, 332 and are rigidly fixed within holes 338, 339 in the gear housing bracket 309 at the second and fourth support pin ends 331, 333. The second gear 314 includes an external flange 317 that is provided with first and second guide holes 318, 319. The external flange 317 extends outwardly from the external teeth 315 of the second gear 314 in a flange plane P that is transverse to the axis of rotation 307 of the axle shaft 304 and that is generally parallel to and spaced from the gear housing bracket 309. The external flange 317 may be integrally formed as part of the second gear 314 or may be a separately formed component that is rotatably fixed to the part of the second gear 314 that includes the external teeth 315. The first and second guide holes 318, 319 extend through the external flange 317 of the second gear 314. The first and second support pins 322, 323 are received in and extend through the first and second guide holes 318, 319 in the external flange 317 of the second gear 314, respectively. The first and second guide holes 318, 319 have first and second guide hole radii 341, 342 and the first and second support pins 322, 323 have first and second support pin radii 361, 362 that are smaller than the first and second guide hole radii 341, 342. In accordance with one example, the first guide hole radius 341 may equal the sum of the first support pin radius 361 and the eccentricity E and the second guide hole radius 342 may equal the sum of the second support pin radius 362 and the eccentricity E. The size relationship between the first and second guide hole radii 341, 342 and the first and second support pin radii 361, 362 permits the second gear 314 to move freely in a planetary, wobbling movement relative to the axis of rotation 307 when the eccentric 302 is rotatably driven. As will be explained in greater detail below, contact between the first bearing surface 313 of the eccentric 302 and the second bore 316 of the second gear 314, the first support pin 322 and the first guide hole 318 in the external flange 317, and the second support pin 323 and the second guide hole 319 in the external flange 317 prevents the first gear 311 from back-driving rotation of the second gear 314.

The position where the first and second support pins 322, 323 intersect the flange plane P is defined by several parameters relative to an orthogonal x-y coordinate system of the flange plane P. In the x-direction (e.g. the horizontal direction), the first and second support pins 322, 323 are placed symmetrically at a first distance D1 from the centerline axis 321 of the second gear 314. In the y-direction (e.g. the vertical direction), the first and second support pins 322, 323 are placed asymmetrically where the first support pin 322 is placed at a second distance D2 from the axis of rotation 307 of the axle shaft 304 and the second support pin 323 is placed at a third distance D3 from the axis of rotation 307 of the axle shaft 304. The second distance D2 and the third distance D3 have different lengths. As a result, you cannot ever draw a straight line that bisects the first and second support pins 322, 323 and that intersects with the axis of rotation 307 of the axle shaft 304, regardless of the angular position of the eccentric 302. The asymmetric arrangement of the first and second support pins 322, 323 improves the mechanical efficiency of the single-stage gear reduction output mechanism 300 by drastically reducing contact forces between the first and second guide holes 318, 319 of the external flange 317 and the first and second support pins 322, 323 when the second gear 314 is located at certain angular positions within its eccentric path (e.g. when the eccentric 302 has been rotated 90 degrees and 270 degrees). By design, the first and second support pins 322, 323 and the first and second guide holes 318, 319 of the external flange 317 form two crank-rocker type parallelogram mechanisms about the axis of rotation 307 of the axle shaft 304. The asymmetric arrangement of the first and second support pins 322, 323 prevents the change-points of the two crank-rocker type parallelogram mechanisms from occurring at the same time (i.e. at the same angular position of the eccentric 302). As a result, spikes in the contact forces between the first and second support pins 322, 323 and the first and second guide holes 318, 319 associated with their respective change-points are smaller in magnitude and are out of phase with one another relative to the angular position of the eccentric 302. The arrangement of the first and second guide holes 318, 319 in the external flange 317 of the second gear 314 relative to the centerline axis 321 of the second gear 314 mirrors the arrangement of the first and second support pins 322, 323 relative to the axis of rotation 307 of the axle shaft 304, which is described above.

The interfaces between the first and second support pins 322, 323 on the second gear 314 and the first and second guide holes 318, 319 in the external flange 317 restrict the movement of the second gear 314 to a planetary, wobbling motion and prevent the second gear 314 from rotating 360 degrees about its centerline axis 321. As will be explained below, the interaction between the first and second support pins 322, 323 and the first and second guide holes 318, 319 in the external flange 317 of the second gear 314 and the interaction of the first bearing surface 313 of the eccentric 302 and the second bore 316 in the second gear 314 prevents the axle shaft 304 from rotating in either direction (i.e. clockwise or counter-clockwise) when the eccentric 302 is not being driven by the actuator 24 and therefore provides anti-back drive capability.

Optionally, first and second roller sleeves 326, 327 may be fitted over the first and second support pins 322, 323. The first and second roller sleeves 326, 327 may be sized to provide a slip fit between the first and second support pins 322, 323 and the first and second roller sleeves 326, 327 such that the first and second roller sleeves 326, 327 are free to rotate on the first and second support pins 322, 323. This arrangement therefore reduces friction losses, wear, and noise during operation of the single-stage gear reduction output mechanism 300. Although the first and second roller sleeves 326, 327 may be made of a variety of different materials, in one non-limiting example, the first and second roller sleeves 326, 327 are made from a self-lubricated plastic material or from a plastic material resistant to high temperature such as PEEK. As an alternative, the first and second guide holes 318, 319 in the external flange 317 of the second gear 314 may be covered by self-lubricated plastic sleeves (not shown) while the first and second support pins 322, 323 slide along the self-lubricated plastic sleeves with or without the use of the first and second roller sleeves 326, 327.

Regardless of whether the first and second roller sleeves 326, 327 or some other alternative are utilized, it should be appreciated that the geometry of the first and second support pins 322, 323 and the first and second guide holes 318, 319 in the external flange 317 of the second gear 314 significantly reduces friction losses. The cylindrical shape of the first and second support pins 322, 323 minimizes the contact area between the first and second support pins 322, 323 and the first and second guide holes 318, 319 to either line or point contacts. As a result, the mechanical efficiency of the single-stage gear reduction output mechanism 300 illustrated in FIGS. 2-7 has been determined to be approximately 7-15 percent higher than traditional single-stage gear reduction output mechanisms with anti-back drive capability.

The second gear 314 moves in a planetary, wobbling motion within a cavity 355 that is defined between the gear housing 301 and the gear housing bracket 309. The planetary, wobbling motion of the second gear 314 can be in a circular eccentric path where the second gear 314 does not rotate about its own centerline axis 321. During the planetary, wobbling motion of the second gear 314, the external teeth 315 of the second gear 314 mesh with the internal teeth 354 of the first gear 311, forcing the first gear 311, the axle shaft 304, and the output pinion 305 to rotate with an uniform rotational speed about the axis of rotation 307 in the same direction of rotation as the direction of rotation of the eccentric 302.

It should be appreciated that the single-stage gear reduction output mechanism 300 has only one, single-stage of gear reduction, which is the gear reduction between the first gear 311 and the second gear 314. The single-stage gear reduction output mechanism 300 operates as a transmission that transfers rotation from a driven element, namely the eccentric 302, to an output element, namely the output pinion 305. The single-stage gear reduction output mechanism 300 has a gear ratio (a reduction ratio) that is dictated by the difference between the number of internal teeth 354 on the first gear 311 and the number of external teeth 315 on the second gear 314. The gear ratio of the single-stage gear reduction output mechanism 300 is defined by Equation 1 below:

$$\text{Gear Ratio} = +\frac{N_2}{N_2 - N_1} \quad \text{(Equation 1)}$$

In accordance with Equation 1, $N_1$ is the number of external teeth 315 on the second gear 314 and $N_2$ is the number of internal teeth 354 on the first gear 311. The gear ratio of the single-stage gear reduction output mechanism 300 is a positive number, indicating that the direction of rotation at the output pinion 305 is the same as the direction of rotation that the eccentric 302 is being driven in by the actuator 24.

In order to maintain the eccentric 302 on the axle shaft 304 in a position where the first bearing surface 313 of the eccentric 302 is longitudinally aligned with the second bore 316 of the second gear 314, a bushing 357 is provided on the axle shaft 304. The bushing 357 is positioned on the axle shaft 304 longitudinally between the eccentric 302 and a spring washer 358 that contacts the gear housing 301. Although the bushing 357 and the spring washer 358 may be made of a variety of different materials, in one non-limiting example, the bushing 357 may be made of plastic and the spring washer 358 may be made of a metal such as steel. On the opposite side of the eccentric 302, a washer cup 359 contacts the eccentric 302 and holds the eccentric 302 in position. The washer cup 359 may be made of a metal and is supported by a rubber ring 360. Both the washer cup 359 and the rubber ring 360 are disposed on the axle shaft 304 longitudinally between the eccentric 302 and the splines 350 of the output pinion 305. The spring washer 358, washer cup 359, and rubber ring 360 are resilient and together apply a centering force on the eccentric 302 that biases the eccentric 302 into longitudinal alignment with the second gear 314.

With reference to FIGS. 3 and 6, any attempt of the first gear 311 to drive the second gear 314 in a counter-clockwise direction, due to an external torque load T1 acting on the output pinion 305 by the sector gear 60, resulting for example from a collision, is prevented through a reaction moment M1 created by a first contact force F1 acting between the second bore 316 of the second gear 314 and the first bearing surface 313 of the eccentric 302 and second and third contact forces F2, F3 acting between the first and second support pins 322, 323 and the first and second guide holes 318, 319 in the external flange 317 of the second gear 314. The first contact force F1 prevents rotation of the eccentric 302. The second and third contact forces F2, F3 operate in the same direction opposite the direction of the first contact force F1, to prevent rotation of the second gear 314, which creates the reaction moment M1 that opposes the external torque load T1 applied to the first gear 311. The second gear 314 is held on its eccentric path relative to the axis of rotation 307 through the engagement of the external teeth 315 of the second gear 314 with the internal teeth 354 of the first gear 311. The contact forces F1-F3 prevent both backwards rotation (i.e. counter-clockwise rotation) of the rotatable shaft 38 of the actuator 24, thereby protecting it from damage, as well as, the backwards rotation (i.e. counter-clockwise rotation) of the output pinion 305, thereby preventing the loss of current height or tilt position of the vehicle seat 69.

All the above formulated considerations are also valid for the case in which the eccentric 302 is rotating in a counter-clockwise direction. In this case, the second gear 314 moves in a planetary, wobbling motion on a circular, eccentric path in a counter-clockwise direction and the first gear 311, the axle shaft 304, and the output pinion 305 rotate in the same counter-clockwise direction. The first gear 311 cannot back drive in the clockwise direction due to a reaction moment and contact forces acting in the opposite directions to those shown in FIGS. 3 and 6.

With reference to FIGS. 8-13, another single-stage gear reduction output mechanism 400 with anti-back drive capability and improved mechanical efficiency is illustrated. The single-stage gear reduction output mechanism 400 shown in FIGS. 8-13 is the same as the single-stage gear reduction output mechanism 300 shown in FIGS. 2-7 except that the shape and arrangement of the external flange 317 of the second gear 314 in FIGS. 2-7 has been changed in FIGS. 8-13. Apart from these changes, the structure and function of the components of the single-stage gear reduction output mechanism 400 shown in FIGS. 8-13 is substantially the same as the structure and function of the components described above in connection with the single-stage gear reduction output mechanism 300 shown in FIGS. 2-7.

The single-stage gear reduction output mechanism 400 shown in FIGS. 8-13 includes a gear housing 401 and an eccentric 402. The eccentric 402 is driven by the actuator 24 shown in FIG. 1, which is connected to the gear housing 401. As such, the eccentric 402 operates as the driven element of the single-stage gear reduction output mechanism 400. The eccentric 402 has a first bore 403. The single-stage gear reduction output mechanism 400 includes an axle shaft 404 and output pinion 405 that are arranged sequentially along an axis of rotation 407. The axle shaft 404 contacts and extends through the first bore 403 of the eccentric 402 such that the eccentric 402 is supported on and can rotate about the axle shaft 404. The axle shaft 404 is rotatably supported by a central bearing surface 406 disposed within the gear housing 401 at one end and a bearing sleeve 408 installed in a gear housing bracket 409 of the single-stage gear reduction output mechanism 400 at the other end. The gear housing bracket 409 is fastened to the gear housing 401 by fasteners 410. The first gear 411 is mounted on and is rotatably fixed with the axle shaft 404. A first gear 411 includes an external bearing surface 412 and internal teeth 454.

The eccentric 402 has a first bearing surface 413 that is cylindrical in shape and that has an eccentricity E. A second gear 414 is disposed within the gear housing 401. The second gear 414 includes a second bore 416 and external teeth 415. The first bearing surface 413 of the eccentric 402 contacts and extends through second bore 416 of the second gear 414 such that the second gear 414 can freely rotate on the first bearing surface 413 of the eccentric 402. The second gear 414 has a centerline axis 421 that extends longitudinally through the second bore 416 and that is parallel to the axis of rotation 407 of the axle shaft 404. The centerline axis 421 of the second gear 414 is spaced from the axis of rotation 407 of the axle shaft 404 by eccentricity E. The internal teeth 454 of the first gear 411 mesh with the external teeth 415 of the second gear 414. When the actuator 24 shown in FIG. 1 drives rotation of the eccentric 402, the second gear 414 executes a planetary, wobbling motion about the axis of rotation 407 of the axle shaft 404 and within the internal teeth 454 of the first gear 411.

The second gear 414 includes an external flange 417. The external flange 417 of the second gear 414 includes first, second, and third guide holes 418, 419, 420. The single-stage gear reduction output mechanism 400 includes first, second, and third support pins 422, 423, 424 that extend through the first, second, and third guide holes 418, 419, 420 in the external flange 417 of the second gear 414. The first, second, and third guide holes 418, 419, 420 in the external flange 417 of the second gear 414 are larger in diameter than the first, second, and third support pins 422, 423, 424. Accordingly, the first, second, and third support pins 422, 423, 424 prevent the second gear 414 from rotating about its centerline axis 421 while still allowing planetary, wobbling movement of the second gear 414 about the axis of rotation 407 of the axle shaft 404. Optionally, the single-stage gear reduction output mechanism 400 may further include first, second, and third roller sleeves 426, 427, 428 that are disposed on and can freely rotate relative to the first, second, and third support pins 422, 423, 424, respectively. The first, second, and third roller sleeves 426, 427, 428 further reduce friction, wear, and noise. The first support pin 422 extends between a first support pin end 430 and a second support pin end 431. The second support pin 423 extends between a third support pin end 432 and a fourth support pin end 433. The third support pin 424 extends between a fifth support pin end 434 and a sixth support pin end 435. The first, second, and third support pins 422, 423, 424 are rigidly fixed to the gear housing 401 at the first, third, and fifth support pin ends 430, 432, 434 and are rigidly fixed within holes 438, 439, 440 in the gear housing bracket 409 at the second, fourth, and sixth support pin ends 431, 433, 435.

The external flange 417 of the second gear 414 extends in a flange plane P. The positions where the first, second, and third support pins 422, 423, 424 intersect the flange plane P are defined by three parameters relative to an orthogonal x-y coordinate system of the flange plane P. In the x-direction (e.g. the horizontal direction), the first and second support pins 422, 423 are placed symmetrically at a first distance D1 from the axis of rotation 407 of the axle shaft 404. In the y-direction (e.g. the vertical direction), the first and second support pins 422, 423 are aligned with the axis of rotation 407 of the axle shaft 404 (i.e. the first and second support pins 422, 423 are not offset with respect to the axis of rotation 407 of the axle shaft 404. As a result, you can draw a straight line that bisects the first and second support pins 422, 423 and that intersects with the axis of rotation 407 of the axle shaft 404. In the x-direction (e.g. the horizontal direction), the third support pin 424 is aligned with the second support pin 423 (i.e. the third support pin 424 is spaced from the axis of rotation 407 of the axle shaft 404 by the first distance D1. In the y-direction (e.g. the vertical direction), the third support pins 424 is placed asymmetrically where the third support pin 424 is placed at a second distance D2 from the axis of rotation 407 of the axle shaft 404. By design, the first, second, and third support pins 422, 423, 424 and the first, second, and third guide holes 418, 419, 420 of the external flange 417 form three crank-rocker type parallelogram mechanisms about the axis of rotation 407 of the axle shaft 404. The arrangement of the first, second, and third support pins 422, 423, 424 prevents the change-points of the three crank-rocker type parallelogram mechanisms from occurring at the same time (i.e. at the same angular position of the eccentric 402). As a result, spikes in the contact forces between the first, second, and third support pins 422, 423, 424 and the first, second, and third guide holes 418, 419, 420 associated with their respective change-points are smaller in magnitude and are out of phase with one another relative to the angular position of the eccentric 402. Moreover, the addition of the third support pin 424 further distributes the contact forces placed on the external flange 417 of the second gear 414, reducing the magnitude of any one contact force applied by the first, second, and third support pins 422, 423, 424. The arrangement of the first, second, and third guide holes 418, 419, 420 in the external flange 417 of the second gear 414 relative to the centerline axis 421 of the second gear 414 mirrors the arrangement of the first, second, and third support pins 422, 423, 424 relative to the axis of rotation 407 of the axle shaft 404, which is described above.

The interfaces between the first, second, and third support pins 422, 423, 424 on the second gear 414 and the first, second, and third guide holes 418, 419, 420 in the external flange 417 restrict the movement of the second gear 414 to a planetary, wobbling motion and prevent the second gear 414 from rotating 360 degrees about its centerline axis 421. As will be explained below, the interaction between the first, second, and third support pins 422, 423, 424 on the second gear 414 and the first, second, and third guide holes 418, 419, 420 in the external flange 417 of the second gear 414 and the interaction of the first bearing surface 413 of the eccentric 402 and the second bore 416 in the second gear 414 prevent the axle shaft 404 from rotating in either direction (i.e. clockwise or counter-clockwise) when the eccentric 402 is not being driven by the actuator 24 and therefore provides anti-back drive capability.

It should be appreciated that the single-stage gear reduction output mechanism 400 has only one, single-stage of gear reduction, which is the gear reduction between the first gear 411 and the second gear 414. The single-stage gear reduction output mechanism 400 operates as a transmission that transfers rotation from a driven element, namely the eccentric 402, to an output element, namely the output pinion 405. The single-stage gear reduction output mechanism 400 has a gear ratio (a reduction ratio) that is dictated by the difference between the number of internal teeth 454 on the first gear 411 and the number of external teeth 415 on the second gear 414. The gear ratio of the single-stage gear reduction output mechanism 400 is defined by Equation 1 set forth above. The gear ratio of the single-stage gear reduction output mechanism 400 shown in FIGS. 8-13 is a positive number, indicating that the direction of rotation at the output pinion 405 is the same as the direction of rotation that the eccentric 402 is being driven in by the actuator 24.

In order to maintain the eccentric 402 on the axle shaft 404 in a position where the first bearing surface 413 of the eccentric 402 is longitudinally aligned with the second bore 416 of the second gear 414, a bushing 457 is provided on the axle shaft 404. The bushing 457 is positioned on the axle shaft 404 longitudinally between the eccentric 402 and a spring washer 458 that contacts the gear housing 401. On the opposite side of the eccentric 402, a washer cup 459 contacts the eccentric 402 and holds the eccentric 402 in position. The washer cup 459 is supported by a rubber ring 460. Both the washer cup 459 and the rubber ring 460 are disposed on the axle shaft 404 longitudinally between the eccentric 402 and the splines 450 of the output pinion 405. The spring washer 458, washer cup 459, and rubber ring 460 are resilient and together apply a centering force on the eccentric 402 that biases the eccentric 402 into longitudinal alignment with the second gear 414.

With reference to FIGS. 9 and 12, any attempt of the first gear 411 to drive the second gear 414 in a counter-clockwise direction, due to an external torque load T1 acting on the output pinion 405 by the sector gear 60, resulting for example from a collision, is prevented through a reaction moment M1 created by a first contact force F1 acting between the second bore 416 of the second gear 414 and the first bearing surface 413 of the eccentric 402 and second, third, and fourth contact forces F2, F3, F4 acting between the first, second, and third support pins 422, 423, 424 and the first, second, and third guide holes 418, 419, 420 in the external flange 417 of the second gear 414. The first contact force F1 prevents rotation of the eccentric 402. At the same time, the second, third, and fourth contact forces F2, F3, F4 operate the same direction, opposite the direction of the first contact force F1, to prevent rotation of the second gear 414, which creates the reaction moment M1 that opposes the external torque load T1 applied to the first gear 411. The second gear 414 is held on its eccentric path relative to the axis of rotation 407 through the engagement of the external teeth 415 of the second gear 414 with the internal teeth 454 of the first gear 411. The contact forces F1-F4 prevent both backwards rotation (i.e. counter-clockwise rotation) of the rotatable shaft 38 of the actuator 24, thereby protecting it from damage, as well as, the backwards rotation (i.e. counter-clockwise rotation) of the output pinion 405, thereby preventing the loss of current height or tilt position of the vehicle seat 69.

All the above formulated considerations are also valid for the case in which the eccentric 402 is rotating in a counter-clockwise direction. In this case, the second gear 414 moves in a planetary, wobbling motion on a circular, eccentric path in a counter-clockwise direction and the first gear 411, the axle shaft 404, and the output pinion 405 rotate in the same counter-clockwise direction. The first gear 411 cannot back drive in the clockwise direction due to a reaction moment and contact forces acting in the opposite directions to those shown in FIGS. 9 and 12.

With reference to FIGS. 14-19, another single-stage gear reduction output mechanism 500 with anti-back drive capability and improved mechanical efficiency is illustrated. The single-stage gear reduction output mechanism 500 shown in FIGS. 14-19 is the same as the single-stage gear reduction output mechanism 300 shown in FIGS. 2-7 except that the shape and arrangement of the external flange 317 of the second gear 314 in FIGS. 2-7 has been changed in FIGS. 14-19. Apart from these changes, the structure and function of the components of the single-stage gear reduction output mechanism 500 shown in FIGS. 14-19 is substantially the same as the structure and function of the components described above in connection with the single-stage gear reduction output mechanism 300 shown in FIGS. 2-7.

The single-stage gear reduction output mechanism 500 shown in FIGS. 14-19 includes a gear housing 501 and an eccentric 502. The eccentric 502 is driven by the actuator 24 shown in FIG. 1, which is connected to the gear housing 501. As such, the eccentric 502 operates as the driven element of the single-stage gear reduction output mechanism 500. The eccentric 502 has a first bore 503. The single-stage gear reduction output mechanism 500 includes an axle shaft 504 and output pinion 505 that are arranged sequentially along an axis of rotation 507. The axle shaft 504 contacts and extends through the first bore 503 of the eccentric 502 such that the eccentric 502 is supported on and can rotate about the axle shaft 504. The axle shaft 504 is rotatably supported by a central bearing surface 506 disposed within the gear housing 501 at one end and a bearing sleeve 508 installed in a gear housing bracket 509 of the single-stage gear reduction output mechanism 500 at the other end. The gear housing bracket 509 is fastened to the gear housing 501 by fasteners 510. A first gear 511 is mounted on and is rotatably fixed with the axle shaft 504. The first gear 511 includes an external bearing surface 512 and internal teeth 515.

The eccentric 502 has a first bearing surface 513 that is cylindrical in shape and that has an eccentricity E. A second gear 514 is disposed within the gear housing 501. The second gear 514 includes a second bore 516 and external teeth 515. The first bearing surface 513 of the eccentric 502 contacts and extends through second bore 516 of the second gear 514 such that the second gear 514 can freely rotate on the first bearing surface 513 of the eccentric 502. The second gear 514 has a centerline axis 556 that extends longitudinally through the second bore 516 and is parallel to the axis of rotation 507 of the axle shaft 504. The centerline axis 556 of the second gear 514 is spaced from the axis of rotation 507 of the axle shaft 504 by eccentricity E. The internal teeth 554 of the first gear 511 mesh with the external teeth 515 of the second gear 514. When the actuator 24 shown in FIG. 1 drives rotation of the eccentric 502, the second gear 514 executes a planetary, wobbling motion about the axis of rotation 507 of the axle shaft 504 and within the internal teeth 554 of the first gear 511.

The second gear 514 includes an external flange 517. The external flange 517 of the second gear 514 includes first, second, third, and fourth guide holes 518, 519, 520, 521. The single-stage gear reduction output mechanism 500 includes first, second, third, and fourth support pins 522, 523, 524, 525 that extend through the first, second, third, and fourth guide holes 518, 519, 520, 521 in the external flange 517 of the second gear 514. The first, second, third, and fourth guide holes 518, 519, 520, 521 in the external flange 517 of the second gear 514 are larger in diameter than the first, second, third, and fourth support pins 522, 523, 524, 525. Accordingly, the first, second, third, and fourth support pins 522, 523, 524, 525 prevent the second gear 514 from rotating about its centerline axis 556 while still allowing planetary, wobbling movement of the second gear 514 about the axis of rotation 507 of the axle shaft 504.

Optionally, the single-stage gear reduction output mechanism 500 may further include first, second, third, and fourth roller sleeves 526, 527, 528, 529 that are disposed on and can freely rotate relative to the first, second, third, and fourth support pins 522, 523, 524, 525, respectively. The first, second, third, and fourth roller sleeves 526, 527, 528, 529 further reduce friction, wear, and noise. The first support pin 522 extends between a first support pin end 530 and a second support pin end 531. The second support pin 523 extends between a third support pin end 532 and a fourth support pin end 533. The third support pin 524 extends between a fifth support pin end 534 and a sixth support pin end 535. The fourth support pin 525 extends between a seventh support pin end 536 and an eighth support pin end 537. The first, second, third, and fourth support pins 522, 523, 524, 525 are rigidly fixed to the gear housing 501 at the first, third, fifth, and seventh support pin ends 530, 532, 534, 536 and are rigidly fixed within holes 538, 539, 540, 541 in the gear housing bracket 509 at the second, fourth, sixth, and eighth support pin ends 531, 533, 535, 537.

The external flange 517 of the second gear 514 extends in a flange plane P. The positions where the first, second, third, and fourth support pins 522, 523, 524, 525 intersect the flange plane P are defined by several parameters relative to an orthogonal x-y coordinate system of the flange plane P. In the x-direction (e.g. the horizontal direction), the first and second support pins 522, 523 are placed symmetrically at a first distance D1 from the axis of rotation 507 of the axle shaft 504. In the y-direction (e.g. the vertical direction), the first and second support pins 522, 523 are aligned with the axis of rotation 507 of the axle shaft 504 (i.e. the first and second support pins 522, 523 are not offset with respect to the axis of rotation 507 of the axle shaft 504). As a result, you can draw a straight line that bisects the first and second support pins 522, 523 and that intersects with the axis of rotation 507 of the axle shaft 504. In the x-direction (e.g. the horizontal direction), the third support pin 524 is aligned with the second support pin 523 (i.e. the third support pin 524 is spaced from the axis of rotation 507 of the axle shaft 504 by the first distance D1). In the y-direction (e.g. the vertical direction), the third support pin 524 is placed asymmetrically where the third support pin 524 is placed at a second distance D2 from the axis of rotation 507 of the axle shaft 504. In the x-direction (e.g. the horizontal direction), the fourth support pin 525 is aligned with the first support pin 525 (i.e. the first support pin 525 is spaced from the axis of rotation 507 of the axle shaft 504 by the first distance D1). In the y-direction (e.g. the vertical direction), the fourth support pin 525 is placed asymmetrically where the fourth support pin 525 is placed at a third distance D3 from the axis of rotation 507 of the axle shaft 504. The second distance D2 between the third support pin 524 and the axis of rotation 507 of the axle shaft 504 and the third distance D3 between the fourth support pin 525 and the axis of rotation 507 of the axle shaft 504 may or may not be equal to one another. By design, the first, second, third, and fourth support pins 522, 523, 524, 525 and the first, second, third, and fourth guide holes 518, 519, 520, 521 of the external flange 517 form four crank-rocker type parallelogram mechanisms about the axis of rotation 507 of the axle shaft 404. The arrangement of the first, second, third, and fourth support pins 522, 523, 524, 525 prevents the change-points of the four crank-rocker type parallelogram mechanisms from occurring at the same time (i.e. at the same angular position of the eccentric 502). As a result, spikes in the contact forces between the first, second, third, and fourth support pins 522, 523, 524, 525 and the first, second, third, and fourth guide holes 518, 519, 520, 521 associated with their respective change-points are smaller in magnitude and are out of phase with one another relative to the angular position of the eccentric 502. Moreover, the addition of the fourth support pin 525 further distributes the contact forces placed on the external flange 517 of the second gear 514, reducing the magnitude of any one contact force applied by the first, second, third, and fourth support pins 522, 523, 524, 525. The arrangement of the first, second, third and fourth guide holes 518, 519, 520, 521 in the external flange 517 of the second gear 514 relative to the centerline axis 556 of the second gear 514 mirrors the arrangement of the first, second, third, and fourth support pins 522, 523, 524, 525 relative to the axis of rotation 507 of the axle shaft 504, which is described above.

The interfaces between the first, second, third, and fourth support pins 522, 523, 524, 525 on the second gear 514 and the first, second, third, and fourth guide holes 518, 519, 520, 521 in the external flange 517 restrict the movement of the second gear 514 to a planetary, wobbling motion and prevent the second gear 514 from rotating 360 degrees about its centerline axis 556. As will be explained below, the interaction between the first, second, third, and fourth support pins 522, 523, 524, 525 on the second gear 514 and the first, second, third, and fourth guide holes 518, 519, 520, 521 in the external flange 517 of the second gear 514 and the interaction of the first bearing surface 513 of the eccentric 502 and the second bore 516 in the second gear 514 prevents the axle shaft 504 from rotating in either direction (i.e. clockwise or counter-clockwise) when the eccentric 502 is not being driven by the actuator 24 and therefore provides anti-back drive capability.

It should be appreciated that the single-stage gear reduction output mechanism 500 has only one, single-stage of gear reduction, which is the gear reduction between the first gear 511 and the second gear 514. The single-stage gear reduction output mechanism 500 operates as a transmission that transfers rotation from a driven element, namely the eccentric 502, to an output element, namely the output pinion 505. The single-stage gear reduction output mechanism 500 has a gear ratio (a reduction ratio) that is dictated by the difference between the number of internal teeth 554 on the first gear 511 and the number of external teeth 515 on the second gear 514. The gear ratio of the single-stage gear reduction output mechanism 500 is defined by Equation 1 set forth above. The gear ratio of the single-stage gear reduction output mechanism 500 shown in FIGS. 14-19 is a positive number, indicating that the direction of rotation at the output pinion 505 is the same as the direction of rotation that the eccentric 502 is being driven in by the actuator 24.

In order to maintain the eccentric 502 on the axle shaft 504 in a position where the first bearing surface 513 of the eccentric 502 is longitudinally aligned with the second bore 516 of the second gear 514, a bushing 557 is provided on the axle shaft 504. The bushing 557 is positioned on the axle shaft 504 longitudinally between the eccentric 502 and a spring washer 558 that contacts the gear housing 501. On the opposite side of the eccentric 502, a washer cup 559 contacts the eccentric 502 and holds the eccentric 502 in position. The washer cup 559 is supported by a rubber ring 560. Both the washer cup 559 and the rubber ring 560 are disposed on the axle shaft 504 longitudinally between the eccentric 502 and the splines 550 of the output pinion 505. The spring washer 558, washer cup 559, and rubber ring 560 are resilient and together apply a centering force on the eccentric 502 that biases the eccentric 502 into longitudinal alignment with the second gear 514.

With reference to FIGS. 15 and 18, any attempt of the first gear 511 to drive the second gear 514 in a counter-clockwise direction, due to an external torque load T1 acting on the output pinion 505 by the sector gear 60, resulting for example from a collision, is prevented through a reaction moment M1 created by a first contact force F1 acting between the second bore 516 of the second gear 514 and the first bearing surface 513 of the eccentric 502 and second, third, fourth, and fifth contact forces F2, F3, F4, F5 acting between the first, second, third, and fourth support pins 522, 523, 524, 525 and the first, second, third, and fourth guide holes 518, 519, 520, 521 in the external flange 517 of the second gear 514. The first contact force F1 prevents rotation of the eccentric 502. At the same time, the second, third, fourth, and fifth contact forces F2, F3, F4, F5 operate in the same direction, opposite the direction of the first contact force F2, to prevent rotation of the second gear 514, which creates the reaction moment M1 that opposes the external torque load T1 applied to the first gear 511. The second gear 514 is held on its eccentric path relative to the axis of rotation 507 through the engagement of the external teeth 515 of the second gear 514 with the internal teeth 554 of the first gear 511. The contact forces F1-F5 prevent both backwards rotation (i.e. counter-clockwise rotation) of the rotatable shaft 38 of the actuator 24, thereby protecting it from damage, as well as, the backwards rotation (i.e. counter-clockwise rotation) of the output pinion 505, thereby preventing the loss of current height or tilt position of the vehicle seat 69.

All the above formulated considerations are also valid for the case in which the eccentric 502 is rotating in a counter-clockwise direction. In this case, the second gear 514 moves in a planetary, wobbling motion on a circular, eccentric path in a counter-clockwise direction and the first gear 511, the axle shaft 504, and the output pinion 505 are rotating in the same counter-clockwise direction. The first gear 511 cannot back drive in the clockwise direction due to a reaction moment and contact forces acting in the opposite directions to those shown in FIG. 15.

With reference to FIGS. 20-25, another single-stage gear reduction output mechanism 600 with anti-back drive capability and improved mechanical efficiency is illustrated. The single-stage gear reduction output mechanism 600 shown in FIGS. 20-25 is the same as the single-stage gear reduction output mechanism 300 shown in FIGS. 2-7 except that the planetary arrangement of the first and second gears 311, 314 in FIGS. 2-7 has been reversed in FIGS. 20-25. In FIGS. 2-7, the first gear 311 is provided with internal teeth 354 and the second gear 314 is provided with external teeth 315 that mesh with the internal teeth 354 of the first gear 311 and drive the second gear 314 in a planetary, wobbling motion within the first gear 311 (i.e. around the inside of the first gear 311). The opposite is true in FIGS. 20-25, where a first gear 611 is provided with external teeth 654 and a second gear 614 is provided with internal teeth 615 that mesh with the external teeth 654 of the first gear 611 to drive the second gear 614 in a planetary, wobbling motion around the first gear 611 (i.e. around the outside of the first gear 611). Apart from those changes, the structure and function of the components of the single-stage gear reduction output mechanism 600 shown in FIGS. 20-25 is substantially the same as the structure and function of the components described above in connection with the single-stage gear reduction output mechanism 300 shown in FIGS. 2-7.

The single-stage gear reduction output mechanism 600 shown in FIGS. 20-25 includes a gear housing 601 and an eccentric 602. The eccentric 602 is driven by the actuator 24 shown in FIG. 1, which is connected to the gear housing 601. As such, the eccentric 602 operates as the driven element of the single-stage gear reduction output mechanism 600. The eccentric 602 has a first bore 603. The single-stage gear reduction output mechanism 600 includes an axle shaft 604 and output pinion 605 that are arranged sequentially along an axis of rotation 607. The axle shaft 604 contacts and extends through the first bore 603 of the eccentric 602 such that the eccentric 602 is supported on and can rotate about the axle shaft 604. The axle shaft 604 is rotatably supported by a central bearing surface 606 disposed within the gear housing 601 at one end and a bearing sleeve 608 installed in a gear housing bracket 609 of the single-stage gear reduction output mechanism 600 at the other end. The gear housing bracket 609 is fastened to the gear housing 601 by fasteners 610. The first gear 611 is mounted on and is rotatably fixed with the axle shaft 604. The first gear 611 includes an external bearing surface 612 in addition to the external teeth 654.

The eccentric 602 has a first bearing surface 613 that is cylindrical in shape and that has an eccentricity E. The second gear 614 includes a second bore 616 in addition to the internal teeth 615. The first bearing surface 613 of the eccentric 602 contacts and extends through second bore 616 of the second gear 614 such that the second gear 614 can freely rotate on the second bearing surface 613 of the eccentric 602. The internal teeth 615 of the second gear 614 mesh with the external teeth 654 of the first gear 611. When the actuator 24 shown in FIG. 1 drives rotation of the eccentric 602, the second gear 614 executes a planetary, wobbling motion about the first gear 611.

The single-stage gear reduction output mechanism 600 further includes first and second support pins 622, 623 that are fixed relative to the gear housing 601 and that extend within a cavity 655 in the gear housing 601. The first and second support pins 622, 623 are spaced from and extend parallel to the axis of rotation 607 of the axle shaft 604. The first support pin 622 extends between a first support pin end 630 and a second support pin end 631. The second support pin 623 extends between a third support pin end 632 and a fourth support pin end 633. The first and second support pins 622, 623 are rigidly fixed within holes 644, 645 in the gear housing 601 at the first and third support pin ends 630, 632 and are rigidly fixed within holes 638, 639 in the gear housing bracket 609 at the second and fourth support pin ends 631, 633. The second gear 614 includes an external flange 617 that is provided with first and second guide holes 618, 619. The external flange 617 extends outwardly from the internal teeth 615 of the second gear 614 in a flange plane P that is transverse to the axis of rotation 607 of the axle shaft 604. The external flange 617 may be integrally formed as part of the second gear 614 or may be a separately formed component that is rotatably fixed to the part of the second gear 614 that includes the internal teeth 615. The first and second support pins 622, 623 are received in and extend through the first and second guide holes 618, 619 in the external flange 617 of the second gear 614, respectively. As will be explained in greater detail below, contact between the first bearing surface 613 of the eccentric 602 and the second bore 616 of the second gear 614, the first support pin 622 and the first guide hole 618 in the external flange 617, and the second support pin 623 and the second guide hole 619 in the external flange 617 prevents the first gear 611 from back-driving rotation of the second gear 614.

The position where the first and second support pins 622, 623 intersect the flange plane P is defined by several parameters relative to an orthogonal x-y coordinate system of the flange plane P. In the x-direction (e.g. the horizontal direction), the first and second support pins 622, 623 are placed symmetrically at a first distance D1 from the axis of rotation 607 of the axle shaft 604. In the y-direction (e.g. the vertical direction), the first and second support pins 622, 623 are placed asymmetrically where the first support pin 622 is placed at a second distance D2 from the axis of rotation 607 of the axle shaft 604 and the second support pin 623 is placed at a third distance D3 from the axis of rotation 607 of the axis shaft 604. As a result, you cannot draw a straight line that bisects the first and second support pins 622, 623 and that intersects with the axis of rotation 607 of the axle shaft 604. The asymmetric arrangement of the first and second support pins 622, 623 improves the mechanical efficiency of the single-stage gear reduction output mechanism 600 by reducing contact forces between the first and second guide holes 618, 619 of the external flange 617 and the first and second support pins 622, 623 when the second gear 614 is located at certain positions within its eccentric path (e.g. when the eccentric 302 has been rotated 90 degrees and 270 degrees). By design, the first and second support pins 622, 623 and the first and second guide holes 618, 619 of the external flange 617 form two crank-rocker type parallelogram mechanisms about the axis of rotation 607 of the axle shaft 604. The asymmetric arrangement of the first and second support pins 622, 623 prevents the change-points of the two crank-rocker type parallelogram mechanisms from occurring at the same time (i.e. at the same angular position of the eccentric 602). As a result, spikes in the contact forces between the first and second support pins 622, 623 and the first and second guide holes 618, 619 associated with their respective change-points are smaller in magnitude and are out of phase with one another relative to the angular position of the eccentric 602. The arrangement of the first and second guide holes 618, 619 in the external flange 617 of the second gear 614 relative to the centerline axis 621 of the second gear 614 mirrors the arrangement of the first and second support pins 622, 623 relative to the axis of rotation 607 of the axle shaft 604, which is described above.

Optionally, first and second roller sleeves 626, 627 may be fitted over the first and second support pins 622, 623. The first and second roller sleeves 626, 627 may be sized to provide a slip fit between the first and second support pins 622, 623 and the first and second roller sleeves 626, 627 such that the first and second roller sleeves 626, 627 are free to rotate on the first and second support pins 622, 623. This arrangement therefore reduces friction losses, wear, and noise during operation of the single-stage gear reduction output mechanism 600. As an alternative, the first and second guide holes 618, 619 in the external flange 617 of the second gear 614 may be covered by self-lubricated plastic sleeves (not shown) while the first and second support pins 622, 623 slide along the self-lubricated plastic sleeves with or without the use of the first and second roller sleeves 626, 627.

Regardless of whether the first and second roller sleeves 626, 627 or some other alternative are utilized, it should be appreciated that the geometry of the first and second support pins 622, 623 and the first and second guide holes 618, 619 in the external flange 617 of the second gear 614 significantly reduces friction losses. The cylindrical shape of the first and second support pins 622, 623 minimizes the contact area between the first and second support pins 622, 623 and the first and second guide holes 618, 619 to either line or point contacts. As a result, the mechanical efficiency of the single-stage gear reduction output mechanism 600 illustrated in FIGS. 20-25 has been determined to be approximately 7-15 percent higher than traditional single-stage gear reduction output mechanisms with anti-back drive capability.

It should be appreciated that the single-stage gear reduction output mechanism 600 has only one, single-stage of gear reduction, which is the gear reduction between the first gear 611 and the second gear 614. The single-stage gear reduction output mechanism 600 operates as a transmission that transfers rotation from a driven element, namely the eccentric 602, to an output element, namely the output pinion 605. The single-stage gear reduction output mechanism 600 has a gear ratio (a reduction ratio) that is dictated by the difference between the number of internal teeth 615 on the second gear 614 and the number of external teeth 654 on the first gear 611. The gear ratio of the single-stage gear reduction output mechanism 600 is defined by Equation 2 below:

$$\text{Gear Ratio} = -\frac{N_1}{N_2 - N_1} \quad \text{(Equation 2)}$$

In accordance with Equation 2, $N_1$ is the number of external teeth 654 on the first gear 611 and $N_2$ is the number of internal teeth 615 on the second gear 614. The gear ratio of the single-stage gear reduction output mechanism 600 is a negative number, indicating that the direction of rotation at the output pinion 605 is opposite from the direction of rotation that the eccentric 602 is being driven in by the actuator 24. Aside from changing the direction of rotation of the output pinion 605 relative to the eccentric 602, it should be appreciated that gear ratio provided by the single-stage gear reduction output mechanism 600 shown in FIGS. 20-25 will be numerically lower than the single-stage gear reduction output mechanism 300 shown in FIGS. 2-7 for any given gear diameter.

In order to maintain the eccentric 602 on the axle shaft 604 in a position where the first bearing surface 613 of the eccentric 602 is longitudinally aligned with the second bore 616 of the second gear 614, a bushing 657 is provided on the axle shaft 604. The bushing 657 is positioned on the axle shaft 604 longitudinally between the eccentric 602 and a spring washer 658 that contacts the gear housing 601. On the opposite side of the eccentric 602, a washer cup 659 supported by a rubber ring 660 contacts the eccentric 602 and holds the eccentric 602 in position. Both the washer cup 659 and the rubber ring 660 are disposed on the axle shaft 604 longitudinally between the eccentric 602 and splines 650 on the output pinion 605. The spring washer 658, washer cup 659, and rubber ring 660 are resilient and together apply a centering force on the eccentric 602 that biases the eccentric 602 into longitudinal alignment with the second gear 614.

With reference to FIGS. 21 and 24, any attempt of the first gear 611 to drive the second gear 614 in a counter-clockwise direction, due to an external torque load T1 acting on the output pinion 605 by the sector gear 60, resulting for example from a collision, is prevented through a reaction moment M1 created by a first contact force F1 acting between the second bore 616 of the second gear 614 and the first bearing surface 613 of the eccentric 602 and second and third contact forces F2, F3 acting between the first and second support pins 622, 623 and the first and second guide holes 618, 619 in the external flange 617 of the second gear 614. The first contact force F1 prevents rotation of the eccentric 602. At the same time, the second and third contact forces F2, F3 operate in the same direction, opposite the direction of the first contact force F1, to prevent rotation of the second gear 614, which creates the reaction moment M1 that opposes the external torque load T1 applied to the first gear 611. The second gear 614 is held on its eccentric path relative to the axis of rotation 607 through the engagement of the internal teeth 615 of the second gear 614 with the external teeth 654 of the first gear 611. The contact forces F1-F3 prevent both backwards rotation (i.e. clockwise rotation) of the rotatable shaft 38 of the actuator 24, thereby protecting it from damage, as well as, the backwards rotation (i.e. counter-clockwise rotation) of the output pinion 605, thereby preventing the loss of current height or tilt position of the vehicle seat 69.

All the above formulated considerations are also valid for the case in which the eccentric 602 is rotating in a clockwise direction. In this case, the second gear 614 moves in a planetary, wobbling motion on a circular, eccentric path in a clockwise direction and the first gear 611, the axle shaft 604, and the output pinion 605 rotate in a counter-clockwise direction. The first gear 611 cannot back drive in the clockwise direction due to a reaction moment and contact forces acting in the opposite directions to those shown in FIG. 21.

With reference to FIGS. 26-31, a single-stage gear reduction output mechanism 700 with anti-back drive capability and improved mechanical efficiency is illustrated. The single-stage gear reduction output mechanism 700 shown in FIGS. 26-31 is the same as the single-stage gear reduction output mechanism 400 shown in FIGS. 8-13 except that the planetary arrangement of the first and second gears 411, 414 in FIGS. 8-13 has been reversed in FIGS. 26-31. In FIGS. 8-13, the first gear 411 is provided with internal teeth 454 and the second gear 414 is provided with external teeth 415 that mesh with the internal teeth 454 of the first gear 411 and drive the second gear 414 in a planetary, wobbling motion within the first gear 411 (i.e. around the inside of the first gear 411). The opposite is true in FIGS. 26-31, where a first gear 711 is provided with external teeth 754 and a second gear 714 is provided with internal teeth 715 that mesh with the external teeth 754 of the first gear 711 to drive the second gear 714 in a planetary, wobbling motion around the first gear 711 (i.e. around the outside of the first gear 711). Apart from those changes, the structure and function of the components of the single-stage gear reduction output mechanism 700 shown in FIGS. 26-31 is substantially the same as the structure and function of the components described above in connection with the single-stage gear reduction output mechanism 400 shown in FIGS. 8-13.

The single-stage gear reduction output mechanism 700 shown in FIGS. 26-31 includes a gear housing 701 and an eccentric 702. The eccentric 702 is driven by the actuator 24 shown in FIG. 1, which is connected to the gear housing 701. As such, the eccentric 702 operates as the driven element of the single-stage gear reduction output mechanism 700. The eccentric 702 has a first bore 703. The single-stage gear reduction output mechanism 700 includes an axle shaft 704 and output pinion 705 that are arranged sequentially along an axis of rotation 707. The axle shaft 704 contacts and extends through the first bore 703 of the eccentric 702 such that the eccentric 702 is supported on and can rotate about the axle shaft 704. The axle shaft 704 is rotatably supported by a central bearing surface 706 disposed within the gear housing 701 at one end and a bearing sleeve 708 installed in a gear housing bracket 709 of the single-stage gear reduction output mechanism 700 at the other end. The gear housing bracket 709 is fastened to the gear housing 701 by fasteners 710. The first gear 711 is mounted on and is rotatably fixed with the axle shaft 704. The first gear 711 is disposed within a cavity 755 in the gear housing 701 and includes an external bearing surface 712 in addition to the external teeth 754.

The eccentric 702 has a first bearing surface 713 that is cylindrical in shape and that has an eccentricity E. The second gear 714 includes a second bore 716 in addition to the internal teeth 715. The first bearing surface 713 of the eccentric 702 contacts and extends through second bore 716 of the second gear 714 such that the second gear 714 can freely rotate on the first bearing surface 713 of the eccentric 702. The internal teeth 715 of the second gear 714 mesh with the external teeth 754 of the first gear 711. When the actuator 24 shown in FIG. 1 drives rotation of the eccentric 702, the second gear 714 executes a planetary, wobbling motion about the first gear 711.

The second gear 714 includes an external flange 717. The external flange 717 of the second gear 714 includes first, second, and third guide holes 718, 719, 720. The single-stage gear reduction output mechanism 700 includes first, second, and third support pins 722, 723, 724 that extend through the first, second, and third guide holes 718, 719, 720 in the external flange 717 of the second gear 714. The first, second, and third guide holes 718, 719, 720 in the external flange 717 of the second gear 714 are larger in diameter than the first, second, and third support pins 722, 723, 724. Accordingly, the first, second, and third support pins 722, 723, 724 prevent the second gear 714 from rotating about its centerline axis 721 while still allowing planetary, wobbling movement of the second gear 714 about the axis of rotation 707 of the axle shaft 704. Optionally, the single-stage gear reduction output mechanism 700 may further include first, second, and third roller sleeves 726, 727, 728 that are disposed on and can freely rotate relative to the first, second, and third support pins 722, 723, 724, respectively. The first, second, and third roller sleeves 726, 727, 728 further reduce friction, wear, and noise. The first support pin 722 extends between a first support pin end 730 and a second support pin end 731. The second support pin 723 extends between a third support pin end 732 and a fourth support pin end 733. The third support pin 724 extends between a fifth support pin end 734 and a sixth support pin end 735. The first, second, and third support pins 722, 723, 724 are rigidly fixed within holes 744, 745, 746 in the gear housing 701 at the first, third, and fifth support pin ends 730, 732, 734 and are rigidly fixed within holes 738, 739, 740 in the gear housing bracket 709 at the second, fourth, and sixth support pin ends 731, 733, 735.

The external flange 717 of the second gear 714 extends in a flange plane P. The positions where the first, second, and third support pins 722, 723, 724 intersect the flange plane P are defined by several parameters relative to an orthogonal x-y coordinate system of the flange plane P. In the x-direction (e.g. the horizontal direction), the first and second support pins 722, 723 are placed symmetrically at a first distance D1 from the axis of rotation 707 of the axle shaft 704. In the y-direction (e.g. the vertical direction), the first and second support pins 722, 723 are aligned with the axis of rotation 707 of the axle shaft 704 (i.e. the first and second support pins 722, 723 are not offset with respect to the axis of rotation 707 of the axle shaft 704). As a result, you can draw a straight line that bisects the first and second support pins 722, 723 and that intersects with the axis of rotation 707 of the axle shaft 704. In the x-direction (e.g. the horizontal direction), the third support pin 724 is aligned with the second support pin 723 (i.e. the third support pin 724 is spaced from the axis of rotation 707 of the axle shaft 704 by the first distance D1. In the y-direction (e.g. the vertical direction), the third support pins 724 is placed asymmetrically where the third support pin 724 is placed at a second distance D2 from the axis of rotation 707 of the axle shaft 704. By design, the first, second, and third support pins 722, 723, 724 and the first, second, and third guide holes 718, 719, 720 of the external flange 717 form three crank-rocker type parallelogram mechanisms about the axis of rotation 707 of the axle shaft 704. The arrangement of the first, second, and third support pins 722, 723, 724 prevents the change-points of the three crank-rocker type parallelogram mechanisms from occurring at the same time (i.e. at the same angular position of the eccentric 702). As a result, spikes in the contact forces between the first, second, and third support pins 722, 723, 724 and the first, second, and third guide holes 718, 719, 720 associated with their respective change-points are smaller in magnitude and are out of phase with one another relative to the angular position of the eccentric 702. Moreover, the addition of the third support pin 724 further distributes the contact forces placed on the external flange 717 of the second gear 714, reducing the magnitude of any one contact force applied by the first, second, and third support pins 722, 723, 724. The arrangement of the first, second, and third guide holes 718, 719, 720 in the external flange 717 of the second gear 714 relative to the centerline axis 721 of the second gear 714 mirrors the arrangement of the first, second, and third support pins 722, 723, 724 relative to the axis of rotation 707 of the axle shaft 704, which is described above.

The interfaces between the first, second, and third support pins 722, 723, 724 on the second gear 714 and the first, second, and third guide holes 718, 719, 720 in the external flange 717 restrict the movement of the second gear 714 to a planetary, wobbling motion and prevent the second gear 714 from rotating 360 degrees about its centerline axis 721. As will be explained below, the interaction between the first, second, and third support pins 722, 723, 724 on the second gear 714 and the first, second, and third guide holes 718, 719, 720 in the external flange 717 of the second gear 714 and the interaction of the first bearing surface 713 of the eccentric 702 and the second bore 716 in the second gear 714 prevent the axle shaft 704 from rotating in either direction (i.e. clockwise or counter-clockwise) when the eccentric 702 is not being driven by the actuator 24 and therefore provides anti-back drive capability.

Regardless of whether the first, second, and third roller sleeves 726, 727, 728 or some other alternative are utilized, it should be appreciated that the geometry of the first, second, and third support pins 722, 723, 724 and the first, second, and third guide holes 718, 719, 720 in the external flange 717 of the second gear 714 significantly reduces friction losses. The cylindrical shape of the first, second, and third support pins 722, 723, 724 minimizes the contact area between the first, second, and third support pins 722, 723, 724 and the first, second, and third guide holes 718, 719, 720 to either line or point contacts. As a result, the mechanical efficiency of the single-stage gear reduction output mechanism 700 illustrated in FIGS. 26-31 has been determined to be approximately 7-15 percent higher than traditional single-stage gear reduction output mechanisms with anti-back drive capability.

It should be appreciated that the single-stage gear reduction output mechanism 700 has only one, single-stage of gear reduction, which is the gear reduction between the first gear 711 and the second gear 714. The single-stage gear reduction output mechanism 700 operates as a transmission that transfers rotation from a driven element, namely the eccentric 702, to an output element, namely the output pinion 705. The single-stage gear reduction output mechanism 700 has a gear ratio (a reduction ratio) that is dictated by the difference between the number of internal teeth 715 on the second gear 714 and the number of external teeth 754 on the first gear 711. The gear ratio of the single-stage gear reduction output mechanism 700 is defined by Equation 2 set forth above. The gear ratio of the single-stage gear reduction output mechanism 700 is a negative number, indicating that the direction of rotation at the output pinion 705 is opposite from the direction of rotation that the eccentric 702 is being driven in by the actuator 24. Aside from changing the direction of rotation of the output pinion 705 relative to the eccentric 702, it should be appreciated that gear ratio provided by the single-stage gear reduction output mechanism 700 shown in FIGS. 26-31 will be numerically lower than the single-stage gear reduction output mechanism 400 shown in FIGS. 8-13 for any given gear diameter.

In order to maintain the eccentric 702 on the axle shaft 704 in a position where the first bearing surface 713 of the eccentric 702 is longitudinally aligned with the second bore 716 of the second gear 714, a bushing 757 is provided on the axle shaft 704. The bushing 757 is positioned on the axle shaft 704 longitudinally between the eccentric 702 and a spring washer 758 that contacts the gear housing 701. On the opposite side of the eccentric 702, a washer cup 759 supported by a rubber ring 760 contacts the eccentric 702 and holds the eccentric 702 in position. Both the washer cup 759 and the rubber ring 760 are disposed on the axle shaft 704 longitudinally between the eccentric 702 and splines 750 on the output pinion 705. The spring washer 758, washer cup 759, and rubber ring 760 are resilient and together apply a centering force on the eccentric 702 that biases the eccentric 702 into longitudinal alignment with the second gear 714.

With reference to FIGS. 27 and 30, any attempt of the first gear 711 to drive the second gear 714 in a counter-clockwise direction, due to an external torque load T1 acting on the output pinion 705 by the sector gear 60, resulting for example from a collision, is prevented through a reaction moment M1 created by a first contact force F1 acting between the second bore 716 of the second gear 714 and the first bearing surface 713 of the eccentric 702 and second, third, and forth contact forces F2, F3, F4 acting between the first, second, and third support pins 722, 723, 724 and the first, second, and third guide holes 718, 719, 720 in the external flange 717 of the second gear 714. The first contact force F1 prevent rotation of the eccentric 702. At the same time, the second, third, and fourth contact forces F2, F3, F4 each operate in the same direction, opposite the direction of the first contact force F1, to prevent rotation of the second gear 714, which creates the reaction moment M1 that opposes the external torque load T1 applied to the first gear 711. The second gear 714 is held on its eccentric path relative to the axis of rotation 707 through the engagement of the internal teeth 715 of the second gear 714 with the external teeth 754 of the first gear 711. The contact forces F1-F4 prevent both backwards rotation (i.e. clockwise rotation) of the rotatable shaft 38 of the actuator 24, thereby protecting it from damage, as well as, the backwards rotation (i.e. counter-clockwise rotation) of the output pinion 705, thereby preventing the loss of current height or tilt position of the vehicle seat 69.

All the above formulated considerations are also valid for the case in which the eccentric 702 is rotating in a clockwise direction. In this case, the second gear 714 moves in a planetary, wobbling motion on a circular path in a clockwise direction and the first gear 711, the axle shaft 704, and the output pinion 705 are rotating in a counter-clockwise direction. The first gear 711 cannot back drive in the clockwise direction due to a reaction moment and contact forces acting in the opposite directions to those shown in FIGS. 27 and 30.

With reference to FIGS. 32-37, a single-stage gear reduction output mechanism 800 with anti-back drive capability and improved mechanical efficiency is illustrated. The single-stage gear reduction output mechanism 800 shown in FIGS. 32-37 is the same as the single-stage gear reduction output mechanism 500 shown in FIGS. 14-19 except that the planetary arrangement of the first and second gears 411, 414 in FIGS. 14-19 has been reversed in FIGS. 32-37. In FIGS. 14-19, the first gear 411 is provided with internal teeth 454 and the second gear 414 is provided with external teeth 415 that mesh with the internal teeth 454 of the first gear 411 and drive the second gear 414 in a planetary, wobbling motion within the first gear 411 (i.e. around the inside of the first gear 411). The opposite is true in FIGS. 32-37, where a first gear 811 is provided with external teeth 854 and a second gear 814 is provided with internal teeth 815 that mesh with the external teeth 854 of the first gear 811 to drive the second gear 814 in a planetary, wobbling motion around the first gear 811 (i.e. around the outside of the first gear 811). Apart from those changes, the structure and function of the components of the single-stage gear reduction output mechanism 800 shown in FIGS. 32-37 is substantially the same as the structure and function of the components described above in connection with the single-stage gear reduction output mechanism 500 shown in FIGS. 14-19.

The single-stage gear reduction output mechanism 800 shown in FIGS. 32-37 includes a gear housing 801 and an eccentric 802. The eccentric 802 is driven by the actuator 24 shown in FIG. 1, which is connected to the gear housing 801. As such, the eccentric 802 operates as the driven element of the single-stage gear reduction output mechanism 800. The eccentric 802 has a first bore 803. The single-stage gear reduction output mechanism 800 includes an axle shaft 804 and output pinion 805 that are arranged sequentially along an axis of rotation 807. The axle shaft 804 contacts and extends through the first bore 803 of the eccentric 802 such that the eccentric 802 is supported on and can rotate about the axle shaft 804. The axle shaft 804 is rotatably supported by a central bearing surface 806 disposed within the gear housing 801 at one end and a bearing sleeve 808 installed in a gear housing bracket 809 of the single-stage gear reduction output mechanism 800 at the other end. The gear housing bracket 809 is fastened to the gear housing 801 by fasteners 810. The first gear 811 is mounted on and is rotatably fixed with the axle shaft 804. The first gear 811 is disposed within a cavity 855 in the gear housing 801 and includes an external bearing surface 812 in addition to the external teeth 854.

The eccentric 802 has a first bearing surface 813 that is cylindrical in shape and has an eccentricity E. The second gear 814 includes a second bore 816 in addition to the internal teeth 815. The first bearing surface 813 of the eccentric 802 contacts and extends through second bore 816 of the second gear 814 such that the second gear 814 can freely rotate on the first bearing surface 813 of the eccentric 802. The internal teeth 815 of the second gear 814 mesh with the external teeth 854 of the first gear 811. When the actuator 24 shown in FIG. 1 drives rotation of the eccentric 802, the second gear 814 executes a planetary, wobbling motion about the first gear 811.

The second gear 814 includes an external flange 817. The external flange 817 of the second gear 814 includes first, second, third, and fourth guide holes 818, 819, 820, 821. The single-stage gear reduction output mechanism 800 includes first, second, third, and fourth support pins 822, 823, 824, 825 that extend through the first, second, third, and fourth guide holes 818, 819, 820, 821 in the external flange 817 of the second gear 814. The first, second, third, and fourth guide holes 818, 819, 820, 821 in the external flange 817 of the second gear 814 are larger in diameter than the first, second, third, and fourth support pins 822, 823, 824, 825. Accordingly, the first, second, third, and fourth support pins 822, 823, 824, 825 prevent the second gear 814 from rotating about its centerline axis 856 while still allowing planetary, wobbling movement of the second gear 814 about the axis of rotation 807 of the axle shaft 804. Optionally, the single-stage gear reduction output mechanism 800 may further include first, second, third, and fourth roller sleeves 826, 827, 828, 829 that are disposed on and can freely rotate relative to the first, second, third, and fourth support pins 822, 823, 824, 825, respectively. The first, second, third, and fourth roller sleeves 826, 827, 828, 829 further reduce friction, wear, and noise. The first support pin 822 extends between a first support pin end 830 and a second support pin end 831. The second support pin 823 extends between a third support pin end 832 and a fourth support pin end 833. The third support pin 824 extends between a fifth support pin end 834 and a sixth support pin end 835. The fourth support pin 825 extends between a seventh support pin end 836 and an eighth support pin end 837. The first, second, third, and fourth support pins 822, 823, 824, 825 are rigidly fixed within holes 844, 845, 846, 847 in the gear housing 801 at the first, third, fifth, and seventh support pin ends 830, 832, 834, 836 and are rigidly fixed within holes 838, 839, 840, 841 in the gear housing bracket 809 at the second, fourth, sixth, and eighth support pin ends 831, 833, 835, 837.

The external flange 817 of the second gear 814 extends in a flange plane P. The positions where the first, second, third, and fourth support pins 822, 823, 824, 825 intersect the flange plane P are defined by several parameters relative to an orthogonal x-y coordinate system of the flange plane P. In the x-direction (e.g. the horizontal direction), the first and second support pins 822, 823 are placed symmetrically at a first distance D1 from the axis of rotation 807 of the axle shaft 804. In the y-direction (e.g. the vertical direction), the first and second support pins 822, 823 are aligned with the axis of rotation 807 of the axle shaft 804 (i.e. the first and second support pins 822, 823 are not offset with respect to the axis of rotation 807 of the axle shaft 804). As a result, you can draw a straight line that bisects the first and second support pins 822, 823 and that intersects with the axis of rotation 807 of the axle shaft 804. In the x-direction (e.g. the horizontal direction), the third support pin 824 is aligned with the second support pin 823 (i.e. the third support pin 824 is spaced from the axis of rotation 807 of the axle shaft 804 by the first distance D1). In the y-direction (e.g. the vertical direction), the third support pin 824 is placed asymmetrically where the third support pin 824 is placed at a second distance D2 from the axis of rotation 807 of the axle shaft 804. In the x-direction (e.g. the horizontal direction), the fourth support pin 825 is aligned with the first support pin 825 (i.e. the first support pin 825 is spaced from the axis of rotation 807 of the axle shaft 804 by the first distance D1). In the y-direction (e.g. the vertical direction), the fourth support pin 825 is placed asymmetrically where the fourth support pin 825 is placed at a third distance D3 from the axis of rotation 807 of the axle shaft 804. The second distance D2 between the third support pin 824 and the axis of rotation 807 of the axle shaft 804 and the third distance D3 between the fourth support pin 825 and the axis of rotation 807 of the axle shaft 804 may or may not be equal to one another. By design, the first, second, third, and fourth support pins 822, 823, 824, 825 and the first, second, third, and fourth guide holes 818, 819, 820, 821 of the external flange 817 form four crank-rocker type parallelogram mechanisms about the axis of rotation 807 of the axle shaft 804. The arrangement of the first, second, third, and fourth support pins 822, 823, 824, 825 prevents the change-points of the four crank-rocker type parallelogram mechanisms from occurring at the same time (i.e. at the same angular position of the eccentric 802). As a result, spikes in the contact forces between the first, second, third, and fourth support pins 822, 823, 824, 825 and the first, second, third, and fourth guide holes 818, 819, 820, 821 associated with their respective change-points are smaller in magnitude and are out of phase with one another relative to the angular position of the eccentric 802. Moreover, the addition of the fourth support pin 825 further distributes the contact forces placed on the external flange 817 of the second gear 814, reducing the magnitude of any one contact force applied by the first, second, third, and fourth support pins 822, 823, 824, 825. The arrangement of the first, second, third, and fourth guide holes 818, 819, 820, 821 in the external flange 817 of the second gear 814 relative to the centerline axis 856 of the second gear 814 mirrors the arrangement of the first, second, third, and fourth support pins 822, 823, 824, 825 relative to the axis of rotation 807 of the axle shaft 804, which is described above.

The interfaces between the first, second, third, and fourth support pins 822, 823, 824, 825 and the first, second, third, and fourth guide holes 818, 819, 820, 821 in the external flange 817 restrict the movement of the second gear 814 to a planetary, wobbling motion and prevent the second gear 814 from rotating 360 degrees about its centerline axis 856. As will be explained below, the interaction between the first, second, third, and fourth support pins 822, 823, 824, 825 and the first, second, third, and fourth guide holes 818, 819, 820, 821 in the external flange 817 of the second gear 814 and the interaction of the first bearing surface 813 of the eccentric 802 and the second bore 816 in the second gear 814 prevent the axle shaft 804 from rotating in either direction (i.e. clockwise or counter-clockwise) when the eccentric 802 is not being driven by the actuator 24 and therefore provides anti-back drive capability.

Regardless of whether the first, second, third, and fourth roller sleeves 826, 827, 828, 829 or some other alternative are utilized, it should be appreciated that the geometry of the first, second, third, and fourth support pins 822, 823, 824, 825 and the first, second, third, and fourth guide holes 818, 819, 820, 821 in the external flange 817 of the second gear 814 significantly reduces friction losses. The cylindrical shape of the first, second, third, and fourth support pins 822, 823, 824, 825 minimizes the contact area between the first, second, third, and fourth support pins 822, 823, 824, 825 and the first, second, third, and fourth guide holes 818, 819, 820, 821 to either line or point contacts. As a result, the mechanical efficiency of the single-stage gear reduction output mechanism 800 illustrated in FIGS. 32-37 has been determined to be approximately 7-15 percent higher than traditional single-stage gear reduction output mechanisms with anti-back drive capability.

It should be appreciated that the single-stage gear reduction output mechanism 800 has only one, single-stage of gear reduction, which is the gear reduction between the first gear 811 and the second gear 814. The single-stage gear reduction output mechanism 800 operates as a transmission that transfers rotation from a driven element, namely the eccentric 802, to an output element, namely the output pinion 805. The single-stage gear reduction output mechanism 800 has a gear ratio (a reduction ratio) that is dictated by the difference between the number of internal teeth 815 on the second gear 814 and the number of external teeth 854 on the first gear 811. The gear ratio of the single-stage gear reduction output mechanism 800 is defined by Equation 2 set forth above. The gear ratio of the single-stage gear reduction output mechanism 800 is a negative number, indicating that the direction of rotation at the output pinion 805 is opposite from the direction of rotation that the eccentric 802 is being driven in by the actuator 24. Aside from changing the direction of rotation of the output pinion 805 relative to the eccentric 802, it should be appreciated that gear ratio provided by the single-stage gear reduction output mechanism 800 shown in FIGS. 32-37 will be numerically lower than the single-stage gear reduction output mechanism 500 shown in FIGS. 14-19 for any given gear diameter.

In order to maintain the eccentric 802 on the axle shaft 804 in a position where the first bearing surface 813 of the eccentric 802 is longitudinally aligned with the second bore 816 of the second gear 814, a bushing 857 is provided on the axle shaft 804. The bushing 857 is positioned on the axle shaft 804 longitudinally between the eccentric 802 and a spring washer 858 that contacts the gear housing 801. On the opposite side of the eccentric 802, a washer cup 859 supported by a rubber ring 860 contacts the eccentric 802 and holds the eccentric 802 in position. Both the washer cup 859 and the rubber ring 860 are disposed on the axle shaft 804 longitudinally between the eccentric 802 and splines 850 on the output pinion 805. The spring washer 858, washer cup 859, and rubber ring 860 are resilient and together apply a centering force on the eccentric 802 that biases the eccentric 802 into longitudinal alignment with the second gear 814.

With reference to FIGS. 33 and 36, any attempt of the first gear 811 to drive the second gear 814 in a counter-clockwise direction, due to an external torque load T1 acting on the output pinion 805 by the sector gear 60, resulting for example from a collision, is prevented through a reaction moment M1 created by a first contact force F1 acting between the second bore 816 of the second gear 814 and the first bearing surface 813 of the eccentric 802 and second, third, forth, and fifth contact forces F2, F3, F4, F5 acting between the first, second, third, and fourth support pins 822, 823, 824, 825 and the first, second, third, and fourth guide holes 818, 819, 820, 821 in the external flange 817 of the second gear 814. The first contact force F1 prevents rotation of the eccentric 802. At the same time, the second, third, fourth, and fifth contact forces F2, F3, F4, F5 each operate in the same direction, opposite to the direction of the first contact force F1, to prevent rotation of the second gear 814, which creates the reaction moment M1 that opposes the external torque load T1 applied to the first gear 811. The second gear 814 is held on its eccentric path relative to the axis of rotation 807 through the engagement of the internal teeth 815 of the second gear 814 with the external teeth 854 of the first gear 811. The contact forces F1-F5 prevent both backwards rotation (i.e. clockwise rotation) of the rotatable shaft 38 of the actuator 24, thereby protecting it from damage, as well as, the backwards rotation (i.e. counter-clockwise rotation) of the output pinion 805, thereby preventing the loss of current height or tilt position of the vehicle seat 69.

All the above formulated considerations are also valid for the case in which the eccentric 802 is rotating in a clockwise direction. In this case, the second gear 814 moves in a planetary, wobbling motion on a circular, eccentric path in a clockwise direction and the first gear 811, the axle shaft 804, and the output pinion 805 are rotating in a counter-clockwise direction. The first gear 811 cannot back drive in the clockwise direction due to a reaction moment and contact forces acting in the opposite directions to those shown in FIGS. 33 and 36.

Many modifications and variations of the present invention are possible in light of the above teachings and may be practiced otherwise than as specifically described while within the scope of the appended claims. These antecedent recitations should be interpreted to cover any combination in which the inventive novelty exercises its utility.

What is claimed is:

1. A single-stage gear reduction output mechanism for an automotive seat adjuster drive, said single-stage gear reduction output mechanism comprising:

a gear housing bracket;

a gear housing extending from said gear housing bracket to define a cavity therein;

an axle shaft disposed within said cavity of said gear housing and extending along an axis of rotation;

said axle shaft being supported within said cavity of said gear housing such that said axle shaft is free to rotate about said axis of rotation;

an eccentric carried on said axle shaft and including a first bore that is concentric with said axle shaft and a first bearing surface that is eccentric relative to said axle shaft;

said axle shaft extending through said first bore in said eccentric with a slip fit such that said eccentric is free to rotate relative to said axle shaft;

a first gear carried on said axle shaft that is rotatably coupled to said axle shaft such that said first gear rotates with said axle shaft about said axis of rotation;

a second gear carried on said first bearing surface of said eccentric and disposed in meshing engagement with said first gear;

said second gear including a second bore and a centerline axis that extends co-axially through said second bore;

said first bearing surface of said eccentric extending through said second bore in said second gear with a slip fit such that said eccentric is free to rotate relative to said second gear;

said first gear and said second gear having a planetary arrangement where said centerline axis of said second gear is parallel to and spaced from said axis of rotation of said axle shaft;

said second gear including an external flange with first and second guide holes that extend through said external flange;

a first support pin rigidly fixed in place relative to said axle shaft that is parallel to said axis of rotation of said axle shaft, is cylindrical in shape, and extends through said first guide hole in said external flange of said second gear;

a second support pin rigidly fixed in place relative to said axle shaft that is parallel to said axis of rotation of said axle shaft, is cylindrical in shape, and extends through said second guide hole in said external flange of said second gear; and said first and second guide holes having first and second guide hole radii and said first and second support pins having first and second support pin radii that are smaller than said first and second guide hole radii such that said second gear is free to move in a planetary, wobbling movement about said axis of rotation in response to rotation of said eccentric while contact between said first bearing surface of said eccentric and said second bore of said second gear, contact between said first support pin and said first guide hole of said external flange, and contact between said second support pin and said second guide hole of said external flange prevents said first gear from driving rotation of said second gear.

2. The single-stage gear reduction output mechanism of claim 1, wherein said external flange of said second gear further includes a third guide hole that receives a third support pin, said third support pin being rigidly fixed in place relative to said axle shaft and parallel to said axis of rotation of said axle shaft.

3. The single-stage gear reduction output mechanism of claim 2, wherein said second and third guide holes are positioned on one side of said centerline axis of said second gear and said first guide hole is positioned on an opposite side of said centerline axis of said second gear.

4. The single-stage gear reduction output mechanism of claim 2, wherein said external flange of said second gear further includes a fourth guide hole that receives a fourth support pin, said fourth support pin being rigidly fixed in place relative to said axle shaft and parallel to said axis of rotation of said axle shaft.

5. The single-stage gear reduction output mechanism of claim 4, wherein said second and third guide holes are positioned on one side of said centerline axis of said second gear and said first and fourth guide holes are positioned on an opposite side of said centerline axis of said second gear.

6. The single-stage gear reduction output mechanism of claim 1, wherein said first gear includes a number of internal teeth and said second gear includes a number of external teeth that are meshingly engaged with said internal teeth of said first gear.

7. The single-stage gear reduction output mechanism of claim 6, wherein said first and second gear have a gear ratio that is a positive integer equaling said number of internal teeth of said first gear divided by the difference between said number of internal teeth of said first gear and said number of external teeth of said second gear.

8. The single-stage gear reduction output mechanism of claim 6, wherein said external teeth of said second gear are disposed radially between said external flange of said second gear and said second bore of said second gear.

9. The single-stage gear reduction output mechanism of claim 1, wherein said first gear includes a number of external teeth and said second gear includes a number of internal teeth that are meshingly engaged with said external teeth of said first gear.

10. The single-stage gear reduction output mechanism of claim 9, wherein said first and second gear have a gear ratio that is a negative integer equaling said number of external teeth of said first gear divided by the difference between said number of internal teeth of said second gear and said number of external teeth of said first gear.

11. The single-stage gear reduction output mechanism of claim 9, wherein said internal teeth of said second gear are disposed radially between said external flange of said second gear and said second bore of said second gear.

12. The single-stage gear reduction output mechanism of claim 1, wherein each of said first and second support pins includes a roller sleeve that is free to rotate, said roller sleeves defining said first and second support pin radii.

13. The single-stage gear reduction output mechanism of claim 1, wherein said first and second guide holes are positioned asymmetrically on opposite sides of said centerline axis of said second gear.

14. The single-stage gear reduction output mechanism of claim 1, wherein said first support pin extends between a first support pin end and a second support pin end, said second support pin extends between a third support pin end and a fourth support pin end, said first and third support pin ends are supported by said housing, and said second and fourth support pin ends are supported by said gear housing bracket.

15. The single-stage gear reduction output mechanism of claim 1, wherein said first bearing surface of said eccentric has an eccentricity, said first guide hole radius equals the sum of said first support pin radius and said eccentricity of said first bearing surface of said eccentric, and said second guide hole radius equals the sum of said second support pin radius and said eccentricity of said first bearing surface of said eccentric.

16. An automotive seat adjuster drive comprising:
a gear housing bracket;
a gear housing extending from said gear housing bracket to define a cavity therein;
an axle shaft disposed within said cavity of said gear housing and extending along an axis of rotation;
said axle shaft being supported within said cavity of said gear housing such that said axle shaft is free to rotate about said axis of rotation;
an eccentric carried on said axle shaft and including a first bore that is concentric with said axle shaft and a first bearing surface that is eccentric relative to said axle shaft;
an actuator mounted to said gear housing and rotatably coupled to eccentric for driving rotation of said eccentric about said axis of rotation of said axle shaft;
said axle shaft extending through said first bore in said eccentric with a slip fit such that said eccentric is free to rotate relative to said axle shaft;
a first gear carried on said axle shaft that is rotatably coupled to said axle shaft such that said first gear rotates with said axle shaft about said axis of rotation;
a second gear carried on said first bearing surface of said eccentric and disposed in meshing engagement with said first gear;
said second gear including a second bore and a centerline axis that extends co-axially through said second bore;
said first bearing surface of said eccentric extending through said second bore in said second gear with a slip fit such that said eccentric is free to rotate relative to said second gear;
said first gear and said second gear having a planetary arrangement where said centerline axis of said second gear is parallel to and spaced from said axis of rotation of said axle shaft;
said second gear including an external flange with first and second guide holes that extend through said external flange;

a first support pin rigidly fixed in place relative to said axle shaft that is parallel to said axis of rotation of said axle shaft, is cylindrical in shape, and extends through said first guide hole in said external flange of said second gear;

a second support pin rigidly fixed in place relative to said axle shaft that is parallel to said axis of rotation of said axle shaft, is cylindrical in shape, and extends through said second guide hole in said external flange of said second gear; and said first and second guide holes having first and second guide hole radii and said first and second support pins having first and second support pin radii that are smaller than said first and second guide hole radii such that said second gear is free to move in a planetary, wobbling movement about said axis of rotation in response to rotation of said eccentric while contact between said first bearing surface of said eccentric and said second bore of said second gear, contact between said first support pin and said first guide hole of said external flange, and contact between said second support pin and said second guide hole of said external flange prevents said first gear from driving rotation of said second gear.

17. The automotive seat adjuster drive of claim 16, wherein said actuator includes a rotatable shaft and a worm that is disposed within said cavity of said gear housing, said worm being rotatably coupled with said rotatable shaft and disposed in meshing engagement with gear teeth provided on said eccentric.

18. The automotive seat adjuster drive of claim 16, wherein said actuator includes a rotatable shaft and a worm that is disposed within said cavity of said gear housing, said worm being rotatably coupled with said rotatable shaft and disposed in meshing engagement with an input gear that is rotatably coupled with said eccentric.

19. An automotive seat assembly comprising:
a frame including two side plates and front and rear cross-members that extend across said frame between said side plates;
a sector gear rotatably coupled with said rear cross-member that rotates with said rear cross-member;
a gear housing bracket attached to one of said side plates of said frame;
a gear housing extending from said gear housing bracket to define a cavity therein;
an axle shaft disposed within said cavity of said gear housing and extending along an axis of rotation;
said axle shaft being supported within said cavity of said housing such that said axle shaft is free to rotate about said axis of rotation;
an output pinion rotatably coupled with said axle shaft that rotates with said axle shaft;
said output pinion including pinion teeth that are meshingly engaged with said sector gear;
an eccentric carried on said axle shaft and including a first bore that is concentric with said axle shaft and a first bearing surface that is eccentric relative to said axle shaft;
an actuator mounted to said gear housing and rotatably coupled to eccentric for driving rotation of said eccentric about said axis of rotation of said axle shaft;
said axle shaft extending through said first bore in said eccentric with a slip fit such that said eccentric is free to rotate relative to said axle shaft;
a first gear carried on said axle shaft that is rotatably coupled to said axle shaft such that said first gear rotates with said axle shaft about said axis of rotation;
a second gear carried on said first bearing surface of said eccentric and disposed in meshing engagement with said first gear;
said second gear including a second bore and a centerline axis that extends co-axially through said second bore;
said first bearing surface of said eccentric extending through said second bore in said second gear with a slip fit such that said eccentric is free to rotate relative to said second gear;
said first gear and said second gear having a planetary arrangement where said centerline axis of said second gear is parallel to and spaced from said axis of rotation of said axle shaft;
said second gear including an external flange with first and second guide holes that extend through said external flange;
a first support pin rigidly fixed in place relative to said axle shaft that is parallel to said axis of rotation of said axle shaft, is cylindrical in shape, and extends through said first guide hole in said external flange of said second gear;
a second support pin rigidly fixed in place relative to said axle shaft that is parallel to said axis of rotation of said axle shaft, is cylindrical in shape, and extends through said second guide hole in said external flange of said second gear; and
said first and second guide holes having first and second guide hole radii and said first and second support pins having first and second support pin radii that are smaller than said first and second guide hole radii such that said second gear is free to move in a planetary, wobbling movement about said axis of rotation in response to rotation of said eccentric while contact between said first bearing surface of said eccentric and said second bore of said second gear, contact between said first support pin and said first guide hole of said external flange, and contact between said second support pin and said second guide hole of said external flange prevents said first gear from driving rotation of said second gear.

20. The automotive seat assembly of claim 19, further comprising a vehicle seat mounted on and supported by said frame.

* * * * *